US012619560B2

(12) United States Patent　　　　　(10) Patent No.:　US 12,619,560 B2
　Horwich et al.　　　　　　　　　　　　(45) Date of Patent:　　May 5, 2026

(54) COMPUTER MEMORY EXPANSION DEVICE AND METHOD OF OPERATION

(71) Applicant: Netlist, Inc., Irvine, CA (US)

(72) Inventors: Jordan Horwich, Corona, CA (US); Jerry Alston, Coto de Caza, CA (US); Chih-Cheh Chen, Ladera Ranch, CA (US); Patrick Lee, Irvine, CA (US); Scott Milton, Irvine, CA (US); Jeekyoung Park, Irvine, CA (US)

(73) Assignee: Netlist, Inc., Irvine, CA (US)

( * ) Notice: Subject to any disclaimer, the term of this patent is extended or adjusted under 35 U.S.C. 154(b) by 0 days.

(21) Appl. No.: 18/803,307

(22) Filed: Aug. 13, 2024

(65) Prior Publication Data

US 2025/0053522 A1　　Feb. 13, 2025

Related U.S. Application Data

(63) Continuation of application No. 18/000,125, filed as application No. PCT/US2021/035317 on Jun. 1, 2021, now Pat. No. 12,061,562.

(Continued)

(51) Int. Cl.
　*G06F 13/16*　　　　(2006.01)
　*G06F 12/0815*　　　(2016.01)
　(Continued)

(52) U.S. Cl.
　CPC ...... *G06F 13/1673* (2013.01); *G06F 12/0815* (2013.01); *G06F 12/0862* (2013.01); *G06F 12/0891* (2013.01); *G06F 13/1642* (2013.01)

(58) Field of Classification Search
　CPC ............ G06F 13/1673; G06F 12/0815; G06F 12/0862; G06F 12/0891; G06F 13/1642;
　　　　　　　(Continued)

(56) References Cited

U.S. PATENT DOCUMENTS 6,829,683 B1 * 12/2004 Kuskin ............... G06F 12/0828
　　　　　　　　　　　　　　　　　　711/143
2016/0048401 A1 * 2/2016 Bhat ..................... G06F 3/0673
　　　　　　　　　　　　　　　　　　718/1

(Continued)

*Primary Examiner* — Hosain T Alam
*Assistant Examiner* — Zubair Ahmed
(74) *Attorney, Agent, or Firm* — Vorys, Sater, Seymour and Pease LLP; Khaled Shami

(57)　　　　　ABSTRACT

A memory expansion device operable with a host computer system (host) comprises a non-volatile memory (NVM) subsystem, cache memory, and control logic configurable to receive a submission from the host including a read command and specifying a payload in the NVM subsystem and demand data in the payload. The control logic is configured to request ownership of a set of cache lines corresponding to the payload, to indicate completion of the submission after acquiring ownership of the cache lines, and to load the payload to the cache memory. The set of cache lines correspond to a set of cache lines in a coherent destination memory space accessible by the host. The control logic is further configured to, after indicating completion of the submission and in response to a request from the host to read demand data in the payload, return the demand data after determining that the demand data is in the cache memory.

20 Claims, 25 Drawing Sheets

1000

Related U.S. Application Data

(60) Provisional application No. 63/032,484, filed on May 29, 2020.

(51) Int. Cl.
*G06F 12/0862* (2016.01)
*G06F 12/0891* (2016.01)

(58) Field of Classification Search
CPC .. G06F 12/0833; G06F 12/08; G06F 12/0868; G06F 12/0813; G06F 12/10; G06F 2212/1024; G06F 2212/214; G06F 2212/312; G06F 2212/621; G06F 2212/7201; Y02D 10/00
USPC .................................................. 711/141, 118
See application file for complete search history.

(56) References Cited

U.S. PATENT DOCUMENTS

| | | | |
|---|---|---|---|
| 2016/0140046 A1* | 5/2016 | Eddy ................... | G06F 12/1009 711/169 |
| 2018/0024929 A1* | 1/2018 | Greiner ............... | G06F 12/0862 711/137 |
| 2018/0143937 A1* | 5/2018 | Willey ................... | G06F 9/466 |

* cited by examiner

COMPUTER MEMORY EXPANSION DEVICE AND METHOD OF OPERATION

CROSS REFERENCE TO RELATED APPLICATIONS

This application is a continuation of U.S. patent application Ser. No. 18/000,125, filed Nov. 28, 2022, which is a US national phase application of PCT Application No. PCT/US2021/035317, filed Jun. 1, 2021, which claims priority to U.S. Provisional Application Ser. No. 63/032,484, filed May 29, 2020, entitled "Software-Defined CXL Memory Controllers and Methods of Operation," each of which is hereby incorporated by reference in its entirety.

FIELD OF THE INVENTION

The various embodiments described in this document relate in general to computer memory, and more specifically to a computer memory expansion device and method of operation.

BACKGROUND

Emerging applications, such as cloud computing, artificial intelligence, and machine learning, are driving demand for faster and faster data processing. With the increasing number of cores per socket running at higher clock frequencies, and the aid of accelerators, such as graphic processing units (GPU's), field-programmable gate arrays (FPGA's), data processing units (DPU's), etc., processor speed, and/or the number of active threads per socket, has been doubling every two years. The increasing processor power places increasing demand on memory capacity and memory speed or bandwidth, which unfortunately do not increase at the same rate. Often, higher memory speed means lower memory capacity, and, as memory capacity increases to keep up with the increase in processor speed, memory latency, which is a measure of how long it takes to complete a memory operation, is also increasing at a rate of about 1.1 times every two years. Thus, solving the problem of memory capacity and bandwidth gaps is critical in the performance of data processing systems.

Software-defined memory (SDM) expansion using Non-Volatile Memory Express Solid-State Drives (NVMe SSD) provides better economics but has various performance issues, such as lack of efficiency across different workloads, poor quality of predictive prefetching due to high latency, large latency penalty for page faults, and lack of efficiency in moving data into coherent host memory.

SUMMARY

In some embodiments, a high density, high bandwidth, and low cost memory expansion device includes non-volatile memory (NVM, e.g., NAND Flash) as tier 1 memory for low-cost virtual memory capacity expansion, optional device DRAM as tier 2 coherent memory for physical memory capacity and bandwidth expansion, and device cache as tier 3 coherent memory for low latency.

In some embodiments, a memory expansion device is operable in a computer system, the computer system including a host computer (host) and a dedicated bus. The memory expansion device comprises interface circuitry configured to communicate with the host via the dedicated bus based on a predefined protocol, a non-volatile memory (NVM) subsystem, cache memory, and control logic coupled to the interface circuitry the cache memory, and the NVM subsystem. The control logic is configurable to receive a first submission from the host, the first submission including a first read command and specifying a first payload in the NVM subsystem. In response to the first submission being of first priority, the control logic is further configured to request ownership of first cache lines corresponding to the first payload, indicate completion of the first submission after acquiring ownership of the first cache lines, and load the first payload to the cache memory, the first cache lines corresponding to cache lines in a first coherent destination memory space accessible by the host.

In some embodiments, the memory expansion device is coupled to the host via a Computer Express Link (CXL) bus, wherein the interface circuitry provides a CXL interface between the control logic and the CXL bus, and wherein the first coherent destination memory space is accessible by the host using a CXL protocol.

In some embodiments, the control logic is further configured to request ownership of the first cache lines from a home agent at the host computer.

In some embodiments, the first submission further specifies demand data in the first payload. The control logic is configured to, before loading the first payload into the cache memory issue first NVM read commands to read the first payload from the NVM subsystem, the first NVM read commands being written into a command queue associated with the NVM subsystem. The control logic is further configured to prioritize reading the demand data from the NVM subsystem when issuing the first NVM read commands such that a logic block address in the NVM subsystem corresponding to a logic block including the demand data is read before logic block addresses corresponding to other logic blocks in the payload.

In some embodiments, the control logic is configured to indicate completion of the first submission before determining that the first payload has been loaded in the cache memory.

In some embodiments, the control logic is further configured to, after indicating completion of the first submission and in response to a memory read request from the host to read demand data in the payload, determine whether the demand data has been loaded in the cache memory, and in response to the demand data having been loaded in the cache memory, return the demand data from the cache memory.

In some embodiments, the control logic is further configured to, after returning the demand data, transfer at least an unread portion of the first payload, to corresponding cache lines in the first cache lines.

In some embodiments, the memory expansion device further comprises device memory providing the first coherent destination memory space.

The memory expansion device of claim 7, wherein the first cache lines correspond to address ranges in a host memory and the rest of first payload, is transferred to the host via the interface circuitry.

In some embodiments, the control logic is further configured to receive a second submission from the host, the second submission including a second read command and specifying a second payload in the NVM subsystem, in response to the second submission being of second priority, load the second payload into a second coherent destination memory space or corresponding to the second payload, and indicate completion of the second submission after the second payload has been loaded into the second coherent destination memory space.

In some embodiments, the control logic is configured to issue first NVM read commands to read the first payload from the NVM subsystem before loading the first payload into the cache memory and to issue second NVM read commands to read the second payload from the NVM subsystem before loading the second payload into the second coherent destination memory space. In some embodiments, the first NVM read commands are written into a first command queue associated with the NVM subsystem, and the second NVM read commands are written into a second command queue associated with the NVM subsystem, the first command queue being of higher priority than the second command queue.

In some embodiments, the memory expansion device further comprises a controller memory buffer (CMB) including submission queues, accessible by the host, the submission queues including at least a first submission queue for queuing submissions of the first priority and at least a second submission queue for queuing submissions of the second priority, wherein the first submission is queued in the first submission queue, and the second submission is queued in the second submission queue.

In some embodiments, the memory expansion device further comprises device memory coupled to the control logic, wherein the CMB occupies designated memory locations in the device memory. In some embodiments, the cache memory includes a CMB cache that is synchronized with the CMB and includes mirrored submission queues corresponding, respectively, to the submission queues in the CMB, and the control logic is further configured to synchronize the CMB cache with the CMB.

In some embodiments, the control logic is configured to maintain selected portions of the CMB memory space in a shared state, so that in response to a cache line of the selected portions being modified by the host causing a shared state corresponding to the cache line being invalidated, the control logic is configured to re-acquire the cache line to reinstate its shared state.

In some embodiments, the control logic further includes a coherent NVM express (cNVMe) controller configured to read the first submission in the first mirrored submission queue in the cache memory in response to the value being written into the register, and to control transferring of the first payload into the cache memory. In some embodiments, the control logic is configured to indicate completion of a submission by writing into a completion queue of the CMB and updating a pointer associated with the completion queue.

In some embodiments, the control logic is further configured to receive the second submission from the host by reading the second submission that has been written into a second submission queue of the one or more submission queues by the host. In some embodiments, the control logic is further configured to determine the first submission being of the first priority based on the first submission having been written into the first submission queue by the host, and to determine the second submission being of the second priority based on the second submission having been written into the second submission queue by the host.

In some embodiments, the memory expansion device further comprises local memory coupled to the control logic, wherein one or both of the first coherent destination memory space and the second coherent destination memory space is provided by the device memory.

In some embodiments, in response to the submission being of the second priority and including one or more hints, the control logic is configured to prepare the second cache lines using the one or more hints. In some embodiments, in response to the submission being of the second priority and including one or more hints, the control logic is configured to write the payload into the second cache lines using the one or more hints.

In some embodiments, the control logic is further configured to receive a third submission from the host, the third submission including a third read command and specifying a third payload. In response to the third submission being of a third priority lower than the second priority, the control logic is further configured to determine whether to fetch the third payload based on predefined criteria, and in response to the determination that the third payload is to be fetched, fetch the third payload, and load the third payload into a private memory space that is hidden from the CPU. In some embodiments, the control logic is further configured to indicate completion of the third submission whether or not it is determined that the third payload is to be fetched based on the predetermined criteria.

In some embodiments, the private memory space is provided by the local memory and is distinct from the first coherent destination memory space and from the second coherent destination memory space.

In some embodiments, the control logic is configured to before loading the first payload into the cache memory, determine whether the first payload has been prefetched and stored in the private memory space, and/or before loading the second payload into the second cache lines, determine whether the second payload has been prefetched and stored in the private memory space. In some embodiments, the control logic is configured to copy the first payload from the private memory space to the cache memory in response to determination that the first payload has been prefetched and stored in the private memory space, and/or copy the second payload from the private memory space to the second coherent destination memory space in response to determination that the second payload has been prefetched and stored in the private memory space. In some embodiments, the control logic is further configured to read the first payload from the NVM subsystem in response to determination that the first payload has not been prefetched and stored in the private memory space, and/or read the second payload from the NVM subsystem in response to determination that the second payload has not been prefetched and stored in the private memory space.

In some embodiments, the local memory includes double data rate (DDR) dynamic random access memory (DRAM).

In some embodiments, the memory expansion device further comprises a controller memory buffer (CMB) accessible by the host, the CMB including submission queues. The control logic is configured to determine the first submission being of the first priority based on the first submission having been written into a first submission queue for queuing submissions of the first priority, determine the second submission being of the second priority based on the second submission having been written into a second submission queue for queuing submissions of the second priority, and determine the third submission being of the third priority based on the third submission having been written into a third submission queue for queuing submissions of the third priority.

In some embodiments, the control logic includes logic circuitry on an integrated circuit chip. In some embodiments, the cache memory includes static random access memory (SRAM) on the integrated circuit chip. In some embodiments, the cache memory includes high bandwidth memory (HBM) coupled to the integrated circuit chip.

In some embodiments, a memory expansion device is operable in a computer system, the computer system including a host computer (host) and a dedicated bus. The memory expansion device comprises interface circuitry configured to communicate with the host via the dedicated bus based on a predefined protocol, a non-volatile memory (NVM) subsystem, local memory providing a coherent memory space accessible by the host, cache memory, and control logic coupled to the interface circuitry the cache memory, and the NVM subsystem. The control logic is configurable to:

receive a submission from the host, the submission including a read command and specifying a payload in the NVM subsystem and demand data in the payload, request ownership of a set of cache lines corresponding to the payload, the set of cache lines corresponding to a set of cache lines in the coherent memory space, indicate completion of the submission after acquiring ownership of the set of cache lines, issue a set of NVM read commands to read the payload from the NVM subsystem, the set of NVM read commands being written into a command queue associated with the NVM subsystem, wherein one or more logic blocks corresponding to the demand data is read from the NVM subsystem before other logic blocks in the payload, load the payload to the cache memory, receive a request from the host to read demand data in the payload, and return the demand data from the cache memory after determining that the demand data has been loaded in the cache memory.

In some embodiments, the control logic is configured to indicate completion of the submission before determining that the demand data has been loaded in the cache memory.

In some embodiments, a method comprises, at a memory expansion device coupled to a host computer (host) via a dedicated bus, the memory expansion device comprising interface circuitry configured to communicate with the host via the dedicated bus based on a predefined protocol, a non-volatile memory (NVM) subsystem, local memory providing a coherent memory space accessible by the host, cache memory, and control logic coupled to the interface circuitry the cache memory, and the NVM subsystem:

receiving a submission from the host, the submission including a read command and specifying a payload in the NVM subsystem and demand data in the payload, requesting ownership of a set of cache lines corresponding to the payload, the set of cache lines corresponding to a set of cache lines in the coherent memory space, indicating completion of the submission after acquiring ownership of the set of cache lines, issuing a set of NVM read commands to read the payload from the NVM subsystem, the set of NVM read commands being written into a command queue associated with the NVM subsystem, wherein one or more logic blocks corresponding to the demand data is read from the NVM subsystem before other logic blocks in the payload, loading the payload to the cache memory, receiving a request from the host to read demand data in the payload, and returning the demand data from the cache memory after determining that the demand data has been loaded in the cache memory.

In some embodiments, the completion of the submission is indicated before determining that the demand data has been loaded in the cache memory.

Thus, in some embodiment, a Computer Express Link (CXL) memory expansion device optimizes a Software-Defined Memory (SDM) communication layer by using an NVMe baseline communication layer to minimize software development/porting effort, while providing new mechanisms for SDM virtual memory management, including SDM predictive algorithms, SDM data migration and coherent cache management, and SDM quality of service (QOS). In some embodiments, the CXL memory expansion device also optimizes data pipelines to minimize critical latencies, resulting in improved page fault recovery time and improved NVM read latency.

In some embodiments, the CXL memory expansion device uses CXL coherency protocols to implement coherent hybrid data transfers, and supports direct cache-to-cache transfers between a host cache and the device cache. Caching is managed by the SDM software to improve the predictive behavior of the SDM software. The optional device DRAM appears as additional coherent host memory accessible by the host processor (or CPU). In some embodiments, the CXL memory further includes control logic configurable to control data transfers in/out of various memory resources in a computer system.

In some embodiments, the memory expansion device supports NVMe extensions, such as central NVMe express (cNVMe$^x$) extension, which is a proprietary extension to the NVMe protocol that tightly couples coherent host memory with NVM prefetch hints. This allows the SDM to influence data and cache management across memory tiers, reduces prefetch loaded latency, and improves the quality and effectiveness of SDM predictive algorithms. It also provides QoS for coherent memory transfers, where the SDM software indicates data priority, and a cDMA engine optimizes cache line access patterns. As a result, low priority data is retained in device memory tiers, medium priority data is transferred to host memory or device DRAM without overloading the CPU data/coherency fabric, and high priority demand data is transferred cache-to-cache, providing improved performance.

BRIEF DESCRIPTION OF THE DRAWINGS

The present embodiments are illustrated by way of example and not limitation in the figures of the accompanying drawings, in which like references indicate similar elements, and in which.

DETAILED DESCRIPTION OF THE EMBODIMENTS

Figure 1:
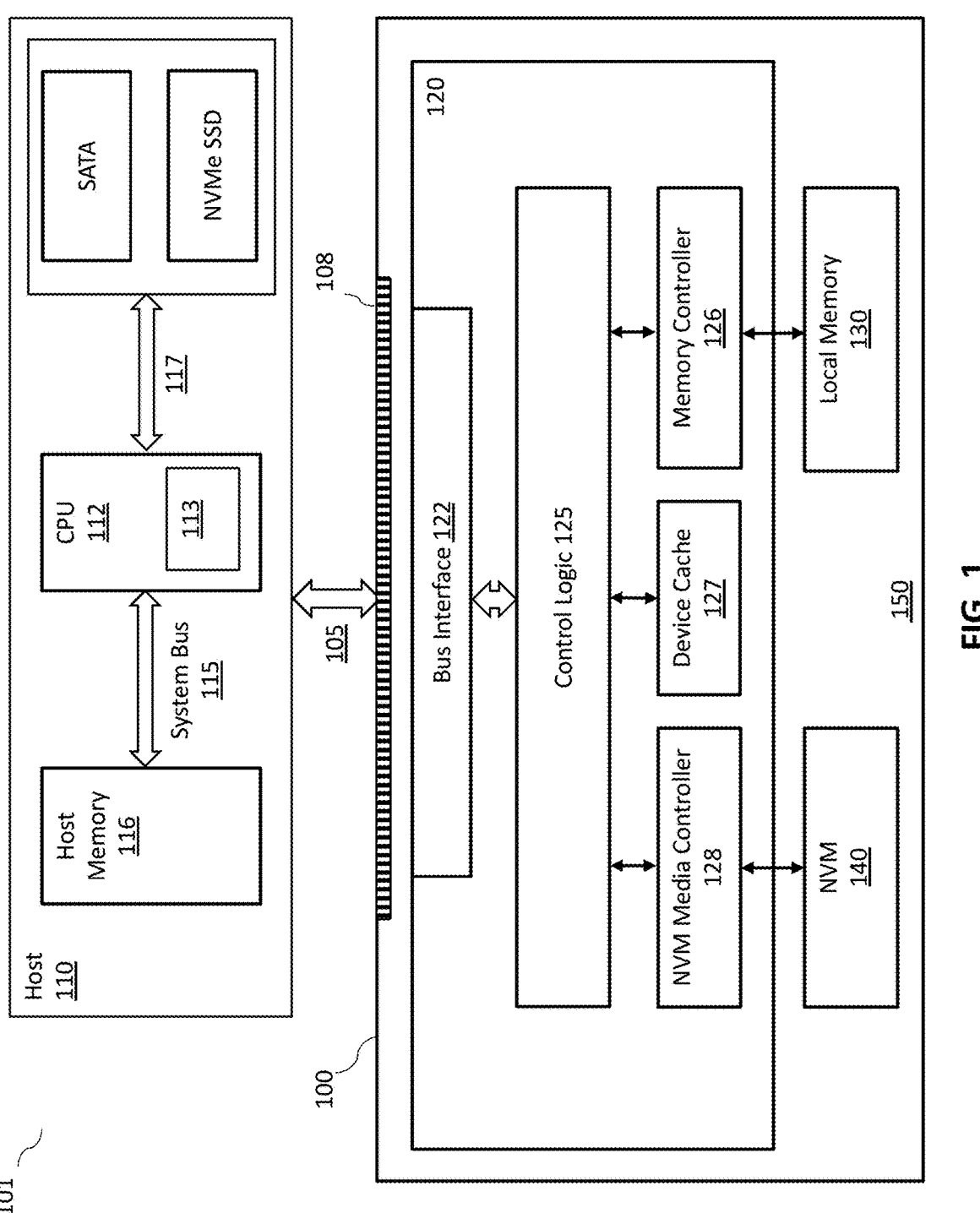
FIG. 1 is a block diagram of a computer system including a software-defined memory expansion device, e.g., a Computer Express Link (CXL) card, coupled to a host computer system (host) via a dedicated link, in accordance with some embodiments.

FIG. 1 is a block diagram of computer system 101 including a host computer (or host) 110 and a coherent memory expansion device (CMX device) 100 coupled to the host via a dedicated bus 105 (e.g., a CXL bus), via which the CPU 112 accesses the memory expansion device 100, in accordance with some embodiments. As shown, host 110 includes one or more central processing units (CPU) 112 (which includes one or more CPU cache 113), and may further include host memory 116, e.g., double data rate (DDR) dynamic random access memory (DRAM), coupled to the CPU 112 via a system bus 115. The host 110 may further include storage devices 118 (e.g., Serial Advanced Technology Attachment or SATA drive(s) and/or NVMe SSD) coupled to the CPU via, for example, one or more Peripheral Component Interconnect express or PCIe links 117.

As shown in FIG. 1, the CMX device 100 includes a coherent memory expansion controller (CMXC) 120 (which includes cache memory or device cache 127), and may further include or has access to local memory 130 (e.g., DDR DRAM), and/or non-volatile memory (NVM) 140 (e.g., NAND Flash memory). FIG. 1 also shows that CMXC

120 includes a bus interface 122 configured to interface with the host via the dedicated bus 105, and control logic (e.g., logic circuitry) 125 coupled to the bus interface 122 and configurable to control communication of commands (or requests) and data between the CPU and local memory 130, and between local memory 130 and NVM 140, and to maintain coherency of the device cache 127 and other caches (e.g., CPU cache 113) in the computer system 101, and the coherency of a memory space mapped to at least part of the local memory 130. Herein, "coherency" or "coherent" may mean uniformity of shared resource data that may end up being stored in different caches. CMXC may 120 further include a memory controller (e.g., a DDR memory controller) configured to interface between the control logic 125 and the device DRAM 130, and/or an NVM media controller 128 configured to interface between the control logic 125 and the NVM 140.

In some embodiments, CMXC 120 can be implemented in an Application Specific Integrated Circuit (ASIC) chip, and device cache 127 includes Static Random Access Memory (SRAM) on the ASIC chip. In some embodiments, CMX device 100 further includes a circuit board 150 (e.g., a printed circuit board or PCB) having a connector 108 including edge connections that can be inserted into an expansion slot (not shown) of the computer system 101 to provide electrical connections between the bus interface 122 with the dedicated bus 105. In some embodiments, the CMXC 120, the NVM 140, and the DRAM are mounted on the circuit board 150, and coupled with each other and to connector 108 via conducting wires in and/or on the circuit board.

Figure 2:
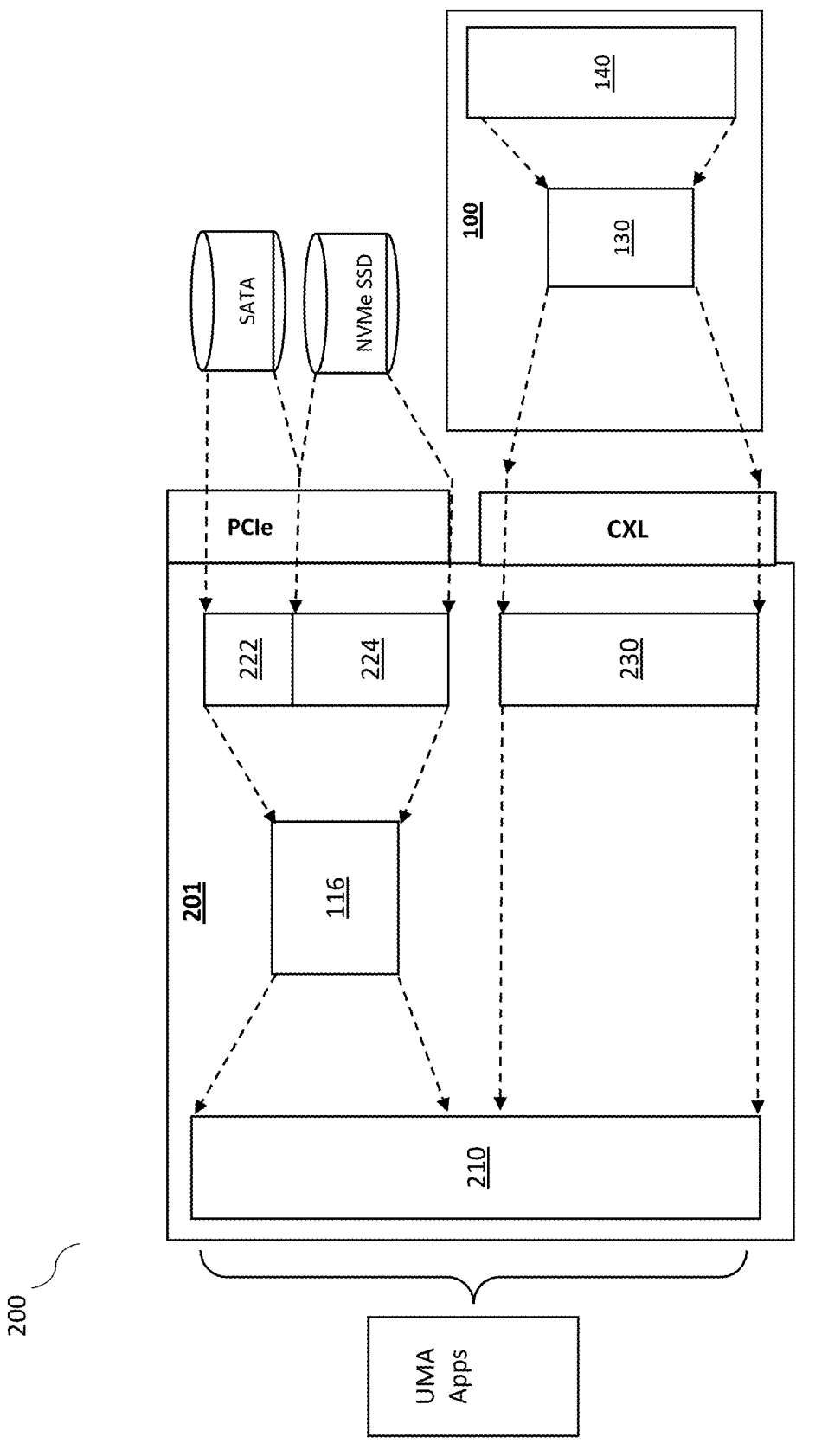
FIG. 2 illustrates a memory map of a computer system including a CXL memory expansion card in accordance with some embodiments.

FIG. 2 illustrates a software-defined memory (SDM) map 200 in accordance with some embodiments. As shown in FIG. 2, SDM software 201 running on the CPU 112 pools various memory and/or storage resources in the computer system 101 together and presents them as a virtual memory space 210 accessible by Uniform Memory Access (UMA) applications running on the CPU 112. Part of virtual memory space 210 is mapped to a physical memory space 222 associated with the SATA and/or a physical memory space 224 associated with the NVME SSD through host memory 116, while another part of the virtual memory space 210 is mapped to a physical memory space 230 associated with NVM 140 through local memory 130 (and/or cache memory 127). For example, the NVM 140 may correspond to a 2 terabyte (TB) or 4 TB virtual memory space that is managed by the SDM software 201, and data can be moved between the NVM 140 and local memory 130 or the host memory 116 under the control of the control logic 125, as discussed below.

Figure 3A:
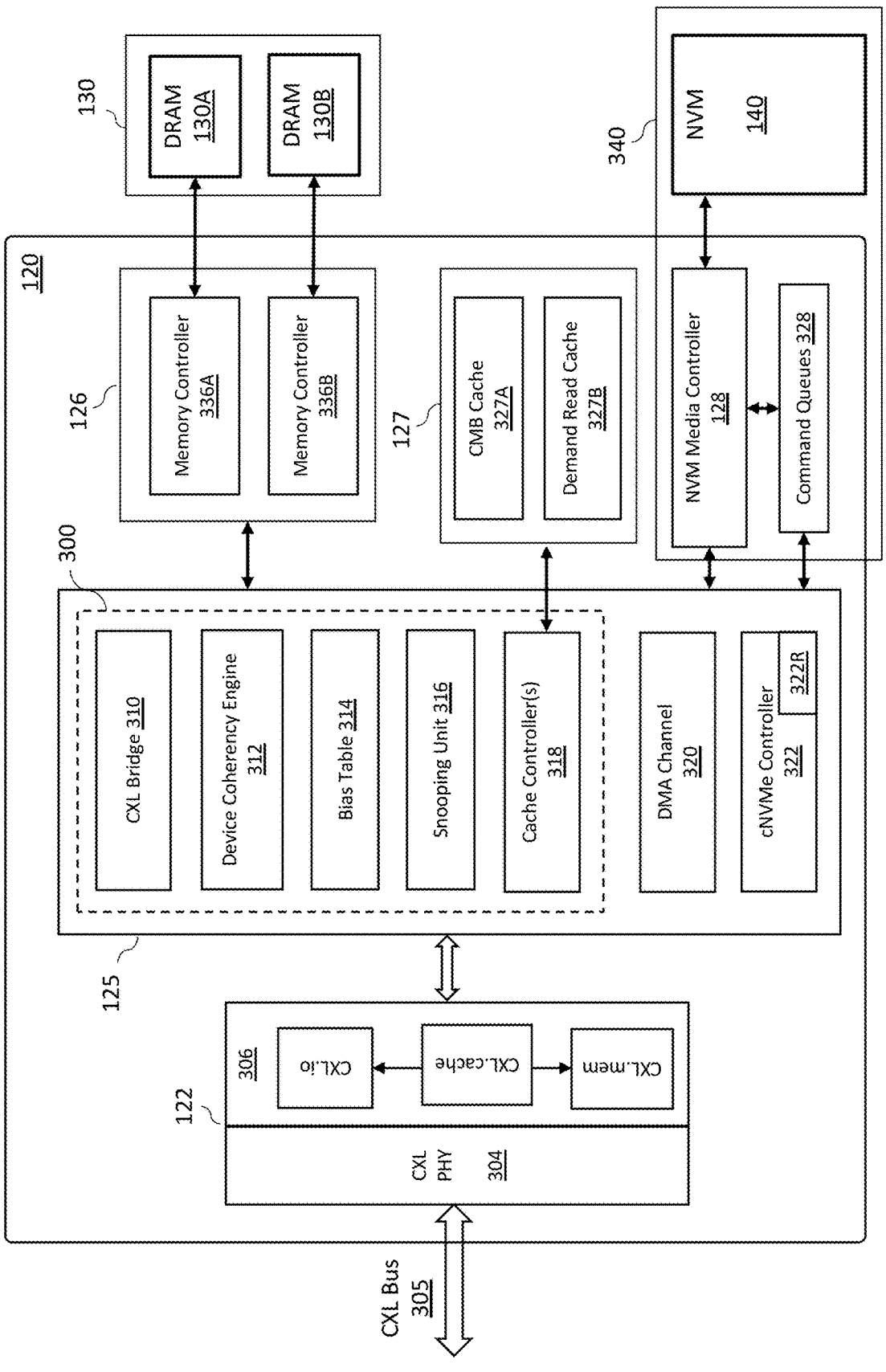
FIG. 3A is a schematic diagram illustrating a software-defined memory expansion device in accordance with some embodiments.

FIG. 3A is a schematic diagram of memory expansion controller 120 in accordance with some embodiments. As shown, in some embodiments, the dedicated bus 105 is a Computer Express Link (CXL) bus 305 and CMX device 100 is implemented as a CXL memory expansion device or a CXL card to be inserted into a CXL expansion slot of the computer system 101. Compute Express Link™ (CXL™) is an industry-supported Cache-Coherent Interconnect for Processors, Memory Expansion and Accelerators. CXL technology provides a link level data transport mechanism while maintaining memory coherency between a central processing unit (CPU) memory space and memory on attached devices, which allows resource sharing for higher performance, reduced software stack complexity, and lower overall system cost. This permits users to simply focus on target workloads as opposed to the redundant memory management hardware in their accelerators. CXL bus 305 is a high-speed CPU-to-device and CPU-to-memory intercon-
nect or link based on the CXL protocol, including sub-
protocols CXL.io, CXL.cache and CXL.memory, which can
be used concurrently. CXL.io is backward compatible with
Peripheral Component Interconnect Express (PCIe) Inter-
face Standard Gen 5. CXL.cache connects a host CPU (e.g.,
CPU 112) to cached memory (e.g., demand read cache
327B) in external processing devices such as the CXL card
100 and/or other types of accelerators, dedicated storage
processors, etc. It can also be used to link computational
storage devices to a host server. CXL.mem enables a host
CPU (e.g., CPU 112) to the memory resources on the CXL
card 100.

As shown in FIG. 3A, in some embodiments, bus inter-
face 122 is configured to interface with the CXL bus 305 and
includes a physical layer 304, e.g., CXL physical layer, and
a protocol layer 306, which is configured to communicate
with the host 110 via the CXL bus 305 via a CXL protocol,
and which includes a set of interfaces corresponding, respec-
tively, to a set of sub-protocols, e.g., CXL.io, CXL.cache,
and CXL.mem, as specified in the CXL Specification 2.1
Evaluation Copy and CXL 1.1 Errata, which are accessible
at https://www.computeexpresslink.org/, and which is incor-
porated herein by reference.

As shown in FIG. 3A, control logic 125 in CMXC 120
includes a CXL bridge 310, a device coherency engine
(DCOH) 312, a bias table 314, a snooping unit 316, one or
more cache controllers 318, a direct memory access (DMA)
channel 320 including one or more DMA engines, and a
coherent NVMe (cNVMe) controller 322. As also shown in
FIG. 3A, cache memory 127 may include a controller
memory buffer (CMB) cache 327A and a demand read cache
327B, local memory 130 may include one or more DRAM
modules or units, e.g., DRAM modules 130A, 130B,
memory controller 126 may include one or more memory
controllers, e.g., memory controllers 336A, 336B, coupled,
respectively, to the one or more DRAM modules 130A,
130B, and NVM media controller 128 may include or is
coupled to associated NVM command queues 328. In some
embodiments, the combination of NVM media controller
128, its associated NVM command queues 328 and NVM
140 is sometimes referred to herein as an NVM subsystem
340.

Figure 3B:
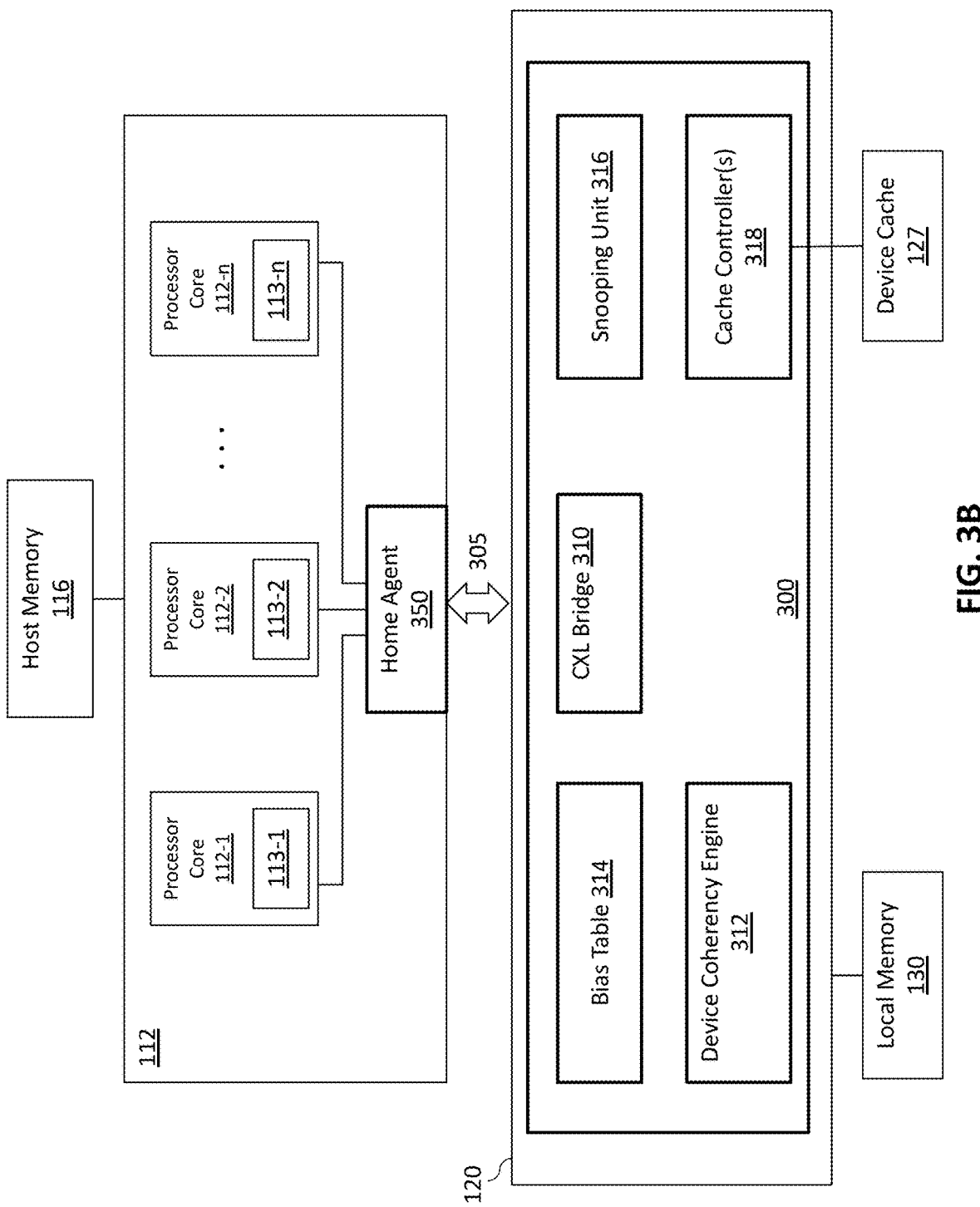
FIG. 3B is a schematic diagram illustrating a coherent interconnect fabric associated with a software-defined memory expansion device in accordance with some embodiments.

In some embodiments, as shown in FIG. 3B, CXL bridge
310, device coherency engine (DCOH) 312, bias table 314,
snooping unit 316, and cache controller(s) 318 are embed-
ded in a coherent interconnect fabric (CIF) 300 of the
computer system 101, and communicate with each other and
with other caching agents (e.g., a home agent for the host)
using a cache coherence protocol, so as to maintain coher-
ency of cache memory 127 and at least part of local memory
130, and other caches and memories such as caches 113-1,
113-2, . . . , 113-n of one or more processor cores 112-1,
112-2, . . . , 112-n in the CPU, and the system memory 116.

In some embodiments, CXL bridge 310 includes a
requesting and caching agent configured to handle CXL
credit management and to perform conversions between the
low latency CXL protocol of the CXL protocol layer 306 and
the cache coherence protocol of the CIF 300. In some
embodiments, DCOH 312 is configured to provide a Point of
Coherency and Point of Serialization for the CIF 300 so that,
for any given access by the host to the memory resources on
the CMX device 100, the DCOH 312 is configured to
resolve a state of each caching agent on the CIF and to
maintain a consistent view of the memory. In some embodi-
ments, if multiple agents are trying to access the same cache
line, DCOH 312 is configured to serialize the accesses to ensure that only one access is allowed at a time and
coherency is maintained for each access.

In some embodiments, a processor core 112-1,
112-2, . . . , 112-n may access physical memory by paging
(e.g., having a page moved in and out of memory), where a
page is the smallest partition of memory mapped by the
processor from a virtual address to a physical address and
may include multiple cache lines. In some embodiments,
bias table 314 is configured to maintain a page-level granu-
larity tracker that tracks whether the host 110 owns one or
more cache lines of a page. In some embodiments, the
DCOH 312 is further configured to snoop a caching agent in
the CIF 300 for a cache line that it has not acquired, and the
snooping unit 316 includes snoop filters configured to track
which caching agents have acquired which cache lines in a
coherent memory space. The snooping unit 316 may include
a remote snoop filter configured to track which cache lines
are owned by the host 110, and a local snoop filter config-
ured to track which cache lines are owned by a caching agent
(e.g., the cache memory 127 via the cache controller(s) 318)
on the CMX device 100.

In some embodiments, CMX device 100 allows the host
110 to access its storage resources (e.g., NVM 140) and
presents them as memory using, for example, the Non-
Volatile Memory (NVM) Express Protocol (NVMe) proto-
col to simplify adoption by SDM software developers. NVM
Express (NVMe) is an interface that allows host software to
communicate with a non-volatile memory subsystem. The
current NVMe Specification Version, i.e., NVMe 1.4a
Specification, which defines how host software communi-
cates with non-volatile memory across a PCI Express®
(PCIe®) bus, is available at https://nvmexpress.org/devel-
opers/nvme-specification/, and is incorporated herein by
reference. In addition to the NVMe protocol, CMX device
100 also provides additional coherency mechanisms and
allows the SDM software to include additional extensions
(or hints) in host NVMe submissions. In some embodiments,
the SDM software 201 initiates data transfers into and out of
the NVM 140 by writing submissions into one or more
submission queues in a controller memory buffer (CMB) on
the CMX device 100, the CMX device 100 indicates
completion of the submissions by writing completions into
one or more completion queues in the CMB.

In some embodiments, cNVMe controller 322 is config-
ured to provide an interface between the CMXC 120 and
SDM software 201 through NVMe queuing mechanism, to
receive NVMe commands from submission queues and
return NVMe completions for those commands, which are
written into the completion queues, and to construct and
send NVM commands to the NVM subsystem 340, which
are written into one or more command queues associated
with the NVM subsystem 340, and to receive completion
status back from the NVM subsystem 340 through one or
more completion queues associated with the NVM subsys-
tem 340. cNVMe controller 322 is further configured to
facilitate movement of data between the NVM subsystem
340 and device cache 127 and/or local memory 130 using
the DMA channel 320.

In some embodiments, part or all of CMXC 120 includes
an application specific integrated circuit (ASIC) die or chip,
and part or all of control logic 125 can be implemented as
logic circuitry on the chip. In some embodiments, CMB
cache 127A and/or demand read cache 327B includes static
random access memory (SRAM) on the chip. In some
embodiments, CMB cache 127A and/or demand read cache
327B include high bandwidth memory (HBM) coupled to
the ASIC chip.

Figure 4:
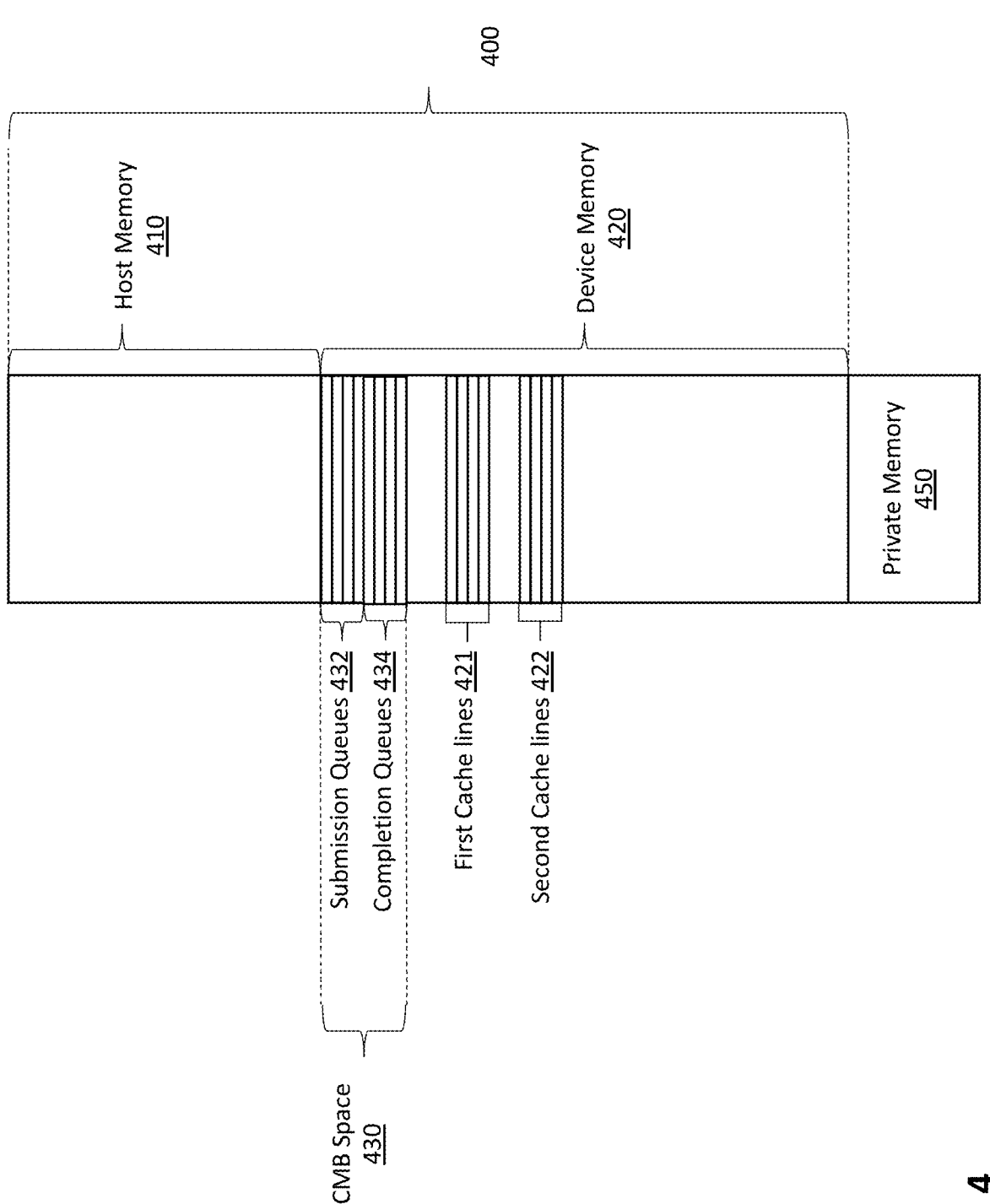
FIG. 4 illustrates some of the memory spaces in a computer system in accordance with some embodiments.

FIG. 4 illustrates various memory spaces in computer system 101 in accordance with some embodiments. As shown, the memory spaces include a coherent host memory space 410 provided by host memory 116, a coherent device memory space 420 provided by local memory 130 and a private memory space 450 also provided by local memory 130. Memory spaces 410 and 420 are in a coherent memory space 400 accessible by the host 110. In some embodiments, a controller memory buffer (CMB) including submission queues 432 and completion queues 434 occupies a CMB space 430 in the coherent device memory space 420. In some embodiments, coherent memory space 400 includes cache lines, e.g., cache lines 421 and cache lines 422, for storing demand and predictive data and other application data. In some embodiments, private memory space 450 is hidden from the host 110 so that it is accessible by control logic 125 but not by the CPU 112. Private memory space 450 can be used to store speculative read data, as discussed further below.

Figure 5:
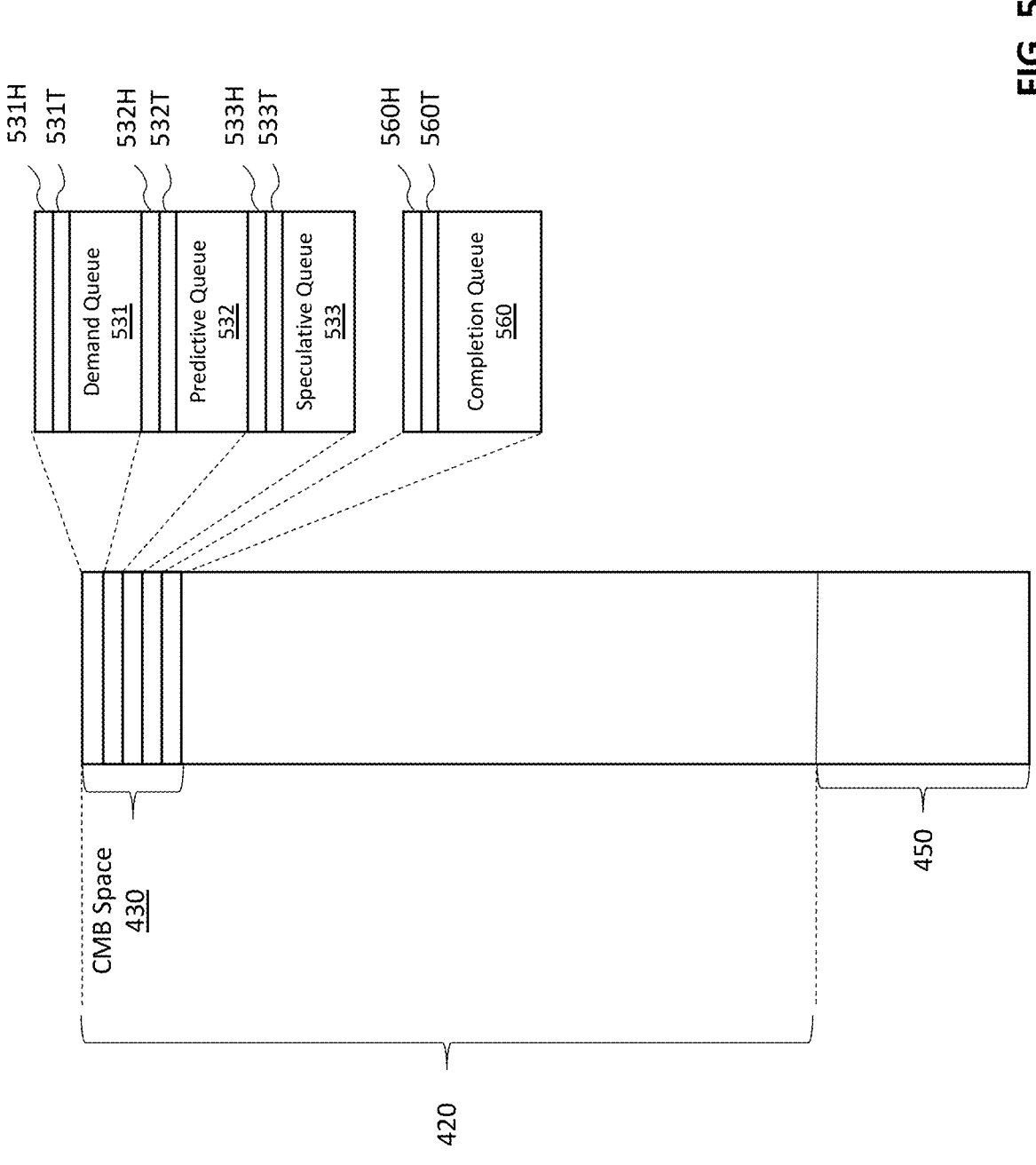
FIG. 5 illustrates some of the memory spaces provided by a local memory of the memory expansion device in accordance with some embodiments.

FIG. 5 illustrates memory spaces associated with local memory 130 and accessible by control logic 125, in accordance with some embodiments. As shown, local memory 130 provides the coherent device memory space 420 and the private memory space 450. FIG. 5 also shows the CMB space 430 as including spaces corresponding to a plurality of submission queues, e.g., one or more demand queues 531, one or more predictive queues 532 and one or more speculative queues 533, and one or more completion queues 560. The CMB space 430 further includes spaces corresponding to head and tail pointers associated with each of the plurality of submission or completion queues, e.g., head pointer 531H and tail pointer 531T associated with demand queue 531, head pointer 532H and tail pointer 532T associated with predictive queue 532, head pointer 533H and tail pointer 533T associated with speculative queue 533, and head pointer 560H and tail pointer 560T associated with one of the one or more completion queues 560. In some embodiments, a head pointer associated with a queue is updated to indicate new available space in the queue, and a tail pointer associated with the queue is updated to indicate a new item is written into the queue.

Figure 6:
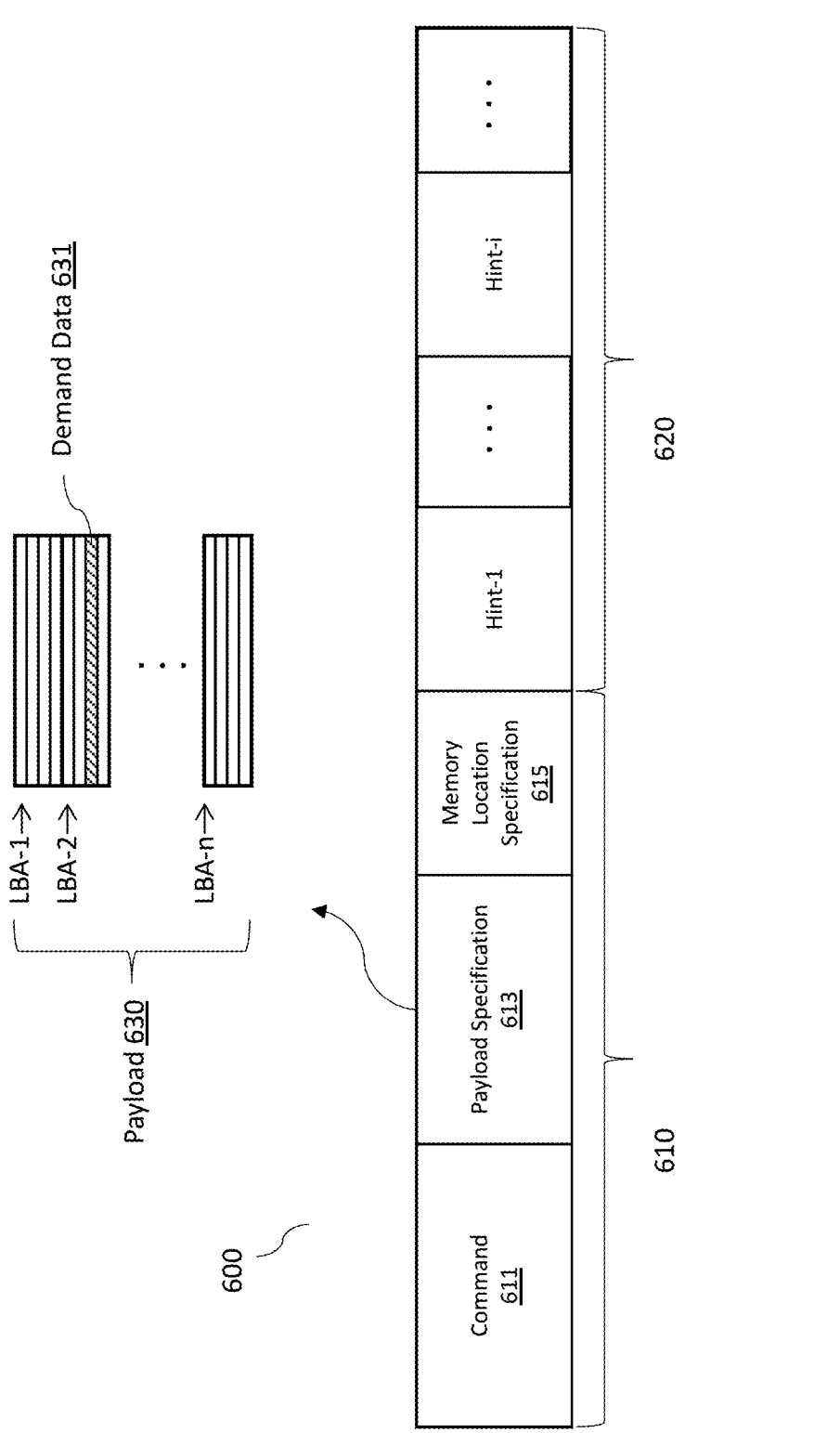
FIG. 6 is a diagram illustrating a submission from the host in accordance with some embodiments.

FIG. 6 is a diagram illustrating a submission 600 from the host 110 in accordance with some embodiments. As shown, in some embodiments, the submission includes a set of data bits of a certain size (e.g., 64 byte) organized in a plurality of fields, including, standard fields 610 and customizable (or vendor specified) fields 620. In some embodiments, the standard fields 610 include a command field for a command 611 (e.g., an NVMe read or write command), one or more fields for payload specification 613 specifying a payload 630 in the NVM subsystem 340 associated with the command, and one or more fields for memory location specification 615 specifying cache lines in a coherent memory space where the payload is to be transferred to or from. In some embodiments, customizable fields 620 include one or more fields 620 for communicating one or more hints that can be used to improve performance during data transfers. In some embodiments, the payload 630 corresponds to a plurality of logical blocks at corresponding logical block addresses (LBA-1, LBA-2, . . . , LBA-n) in the NVM 130 and can be specified by an LBA of a starting logical block (e.g., LBA-1) and a number of logical blocks n starting at the starting logical block.

In some embodiments, a submission from the host 110 is for a demand read (e.g., an NVM read in response to a page fault having occurred at the host 110) and can specify which block among the number of logical blocks includes demand data 631 (e.g., data needed by the Host 110 to resolve the page fault). In some embodiments, an LBA size can be, for example, at least 512 bytes, and the least significant 9 bits of the starting LBA are usually zero and are therefore ignored by the NVM subsystem 340. These least significant bits can be used to specify the logical block containing the demand data 631 so that reading the logical block from the NVM subsystem 340 is prioritized over reading the other logical blocks from the NVM subsystem 340. For example, if the payload includes four logical blocks, using two least significant bits of the starting LBA: LBA[1:0]=00 can be used to indicate that the $1^{st}$ Logical Block is of higher priority and is to be transferred first, followed by the others that are of lower priority; LBA[1:0]=01 can be used to indicate that the 2nd Logical Block is of higher priority and is to be transferred first, followed by the others that are of lower priority; LBA[1:0]=10 can be used to indicate that the 3rd Logical Block is of higher priority and is to be transferred first, followed by the others that are of lower priority; and LBA[1:0]=11 can be used to indicate that the 4th Logical Block is of higher priority and is to be transferred first, followed by the others that are of lower priority.

In addition to demand read (e.g., an operation to resolve page fault at the host), CMX device 100 also facilitates predictive read (e.g., an operation to load a payload in a coherent memory space 410 or 420 based on prediction that the payload may be needed in a predictive time frame) and speculative read (e.g., an operation to load a payload in the private memory space 450 based on speculation that the payload may be needed in a speculative time frame. In some embodiments, control logic control logic 125 is configured to process a submission from the host 110 with a certain priority based on whether the submission is for demand read, predictive read, or speculative read.

Figure 7:
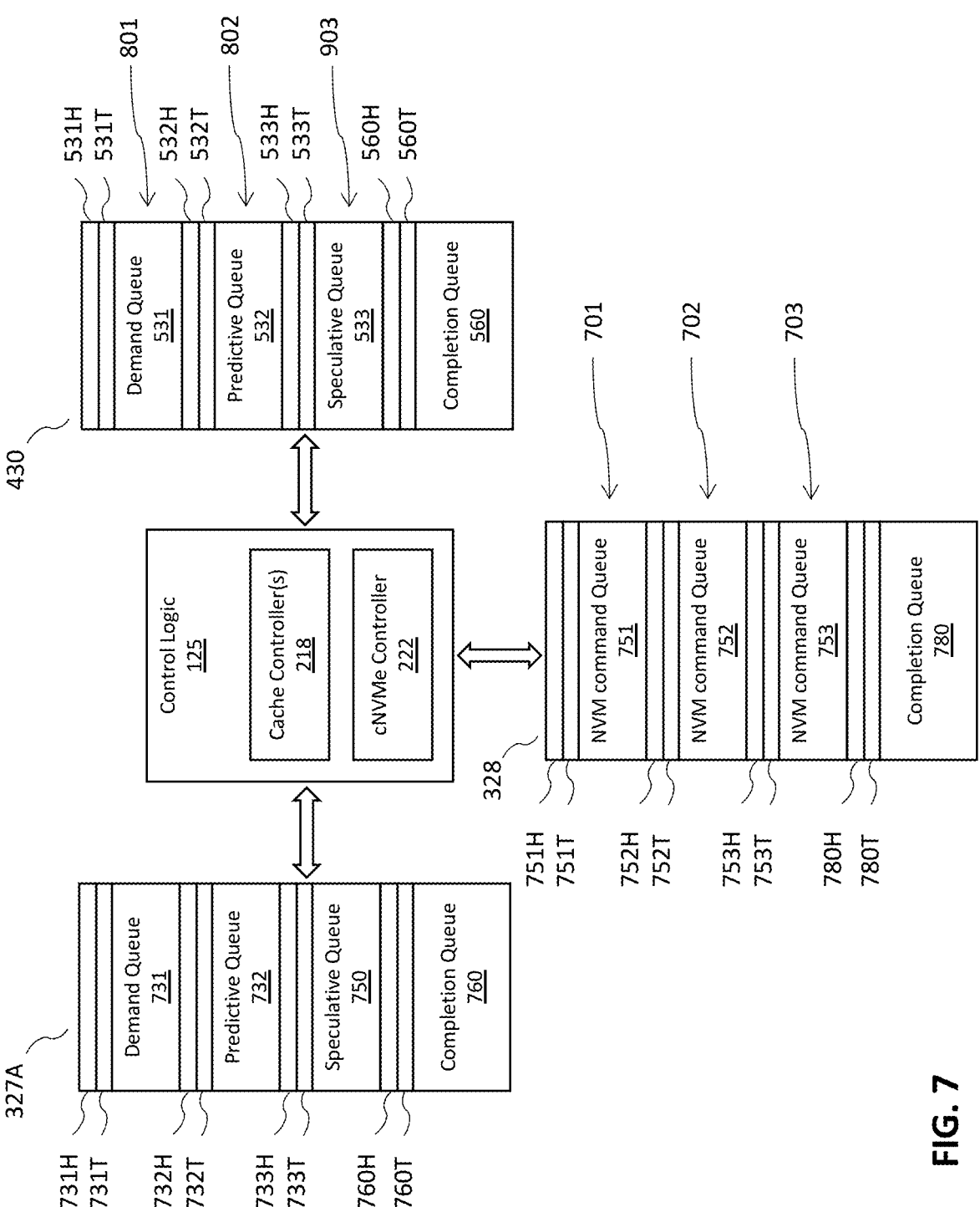
FIG. 7 illustrates a controller memory buffer (CMB), a CMB cache and NVM command and completion queues in accordance with some embodiments.

In some embodiments, as shown in FIG. 7, CMB cache 327A is synchronized with the CMB space 430 and includes one or more synchronized (or mirrored) submission queues 731, 732, 733, corresponding, respectively, to the one or more submission queues, e.g., demand queue 531, predictive queue 532, speculative queue speculative queue speculative queue speculative queue 533, in the CMB. In some embodiments, CMB cache 327A further includes synchronized head/tail pointers, e.g., head/tail pointers 1231H/1231T, 1232H/1232T, 1233H/1233T, corresponding, respectively, to the head/tail pointers 531H/531T, 532H/532T, 533H/533T, in the CMB. In some embodiments, CMB cache 327A further includes one or more synchronized (or mirrored) completion queues 760, and their respective head/tail pointers 760H/2160T, corresponding, respectively, to the one or more completion queue 560 and their respective head/tail pointers 560H/560T in the CMB.

In some embodiments, cache controller(s) 318 is configured to maintain selected portions of the CMB memory space in a shared state. If any cache line of the selected portions of the CMB memory space is modified by the CPU 112, the shared state in the cache controller(s) 318 is invalidated and the cache controller(s) 318 would re-acquire the cache line in a shared state once again. If the data in the cache line that has been re-acquired has changed from its previous value, it is an indication the CPU has written to the cache line in a process to update a submission entry or a head or tail pointer. In some embodiments, the cNVMe controller 322 includes registers 322R corresponding, respectively, to the head/tail pointers in the CMB, and cache controller(s) 318 is further configured to alert the cNVMe controller 322 when a new submission is written into the CMB or mirrored in the CMB cache 327A by, for example, writing into a corresponding register 322R of the cNVMe controller 322. In response, cNVMe controller 322 would read the NVMe submission from the CMB cache 327A and start transfers of data to or from the NVM 140 by, for example, issuing NVM read or write commands to the NVM subsystem 340, and instructing the DMA channel 320 to move the data between the different memory and storage resources, in accordance with the NVMe submission. In some embodiments, cache controller(s) 318 is further configured to acquire ownership of cache lines requested by the cNVMe controller 322 and to control the demand read cache 327B, which is used to buffer demand read data, as discussed above and further below.

In some embodiments, as shown in FIG. 7, the NVM queues 328 include one or more NVM command queues, e.g., NVM command queues 751, 752, 753, corresponding, respectively, to the one or more submission queues, e.g., demand queue 531, predictive queue 532, speculative queue speculative queue 533, in the CMB, or to the one or more mirrored submission queues in the CMB cache 327A. in some embodiments, NVM commands queued in NVM command queue 751 is processed by the NVM subsystem 340 with a higher priority than NVM command queued in the NVM command queue 752, and NVM commands queued in NVM command queue 752 is processed by the NVM subsystem 340 with a higher priority than NVM command queued in the NVM command queue 753. Thus, the cNVMe controller 322 can prioritize demand read over an on-going predictive read or speculative read, and prioritize predictive read over an on-going speculative read, by writing the NVM commands associated with the demand read into NVM command queue 751, the NVM commands associated with the predictive read into NVM command queue 752, and the NVM commands associated with the speculative read into NVM command queue 753. In some embodiments, the NVM queues 328 further include one or more completion queues 780, and the NVM subsystem 340 can indicate completion of an NVM read or write command by writing the completion into one of the completion queues 780. As shown, NVM queues 328 further includes head/tail pointers 751H/751T, 752H/752T, 753H/753T, 780H/780T, associated, respectively with the NVM queues 751, 752, 753, 780.

In some embodiments, in response to a submission for demand read and specifying demand data, cNVMe controller 322 is further configured to prioritize transfer of the demand data from the NVM subsystem 340 to the demand read cache 327B over the rest of the payload. For example, cNVMe controller 322 may do so by writing the NVM read command corresponding to the logical block including the demand data into the NVM command queue 751 before writing the NVM read commands corresponding to the other logical blocks in the payload data into the NVM command queue 751.

Figure 8A:
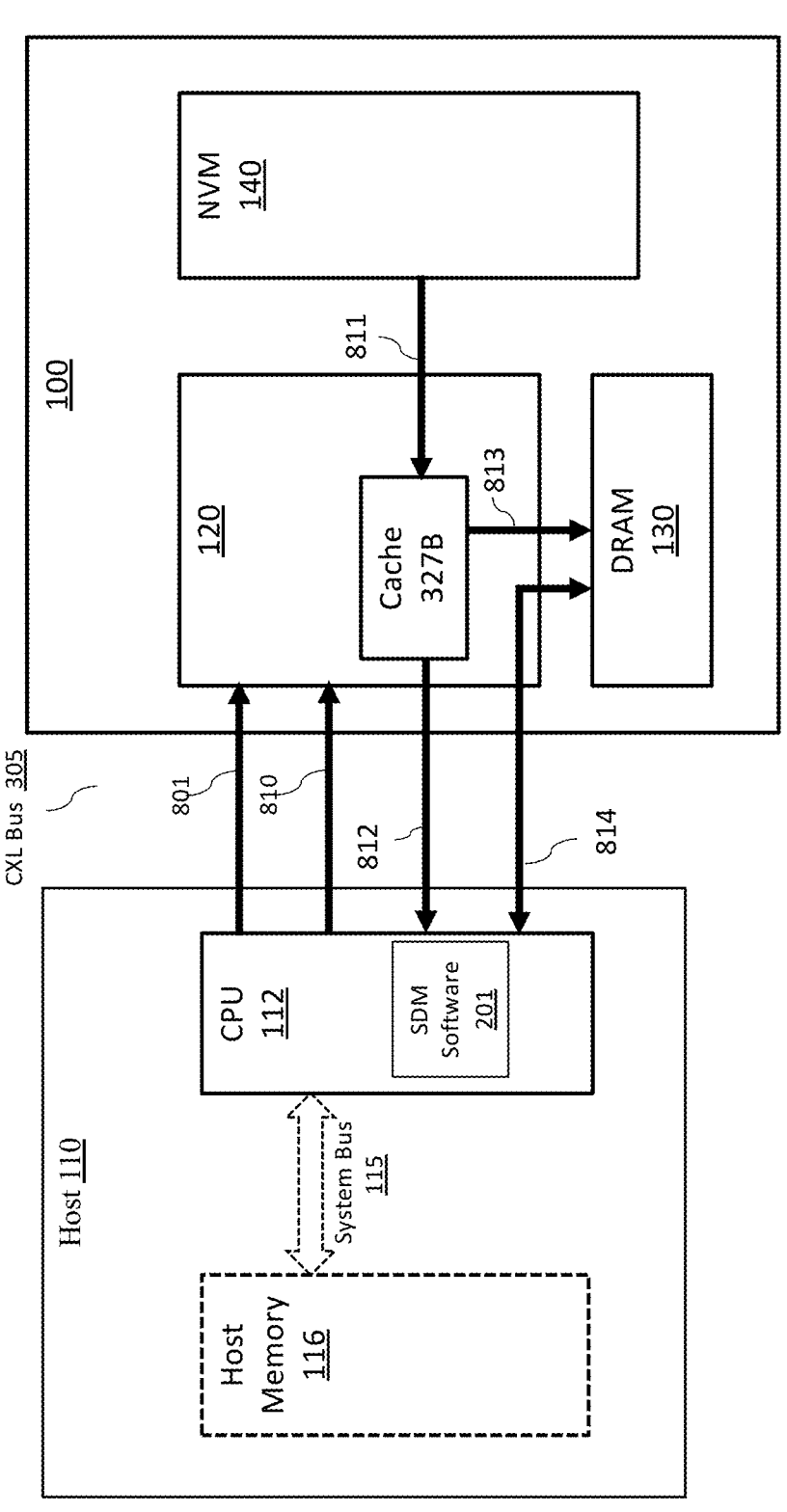
FIGS. 8A-8B and 9 illustrate various operations of a memory expansion device in accordance with some embodiments.

In some embodiments, control logic control logic 125 is configured to process a submission differently depending on whether the submission is for demand read, predictive read, or speculative read. As shown in FIG. 8A, in response to a first submission 801 for demand read, control logic 125 is configured to transfer a payload 811 specified in submission 801 from the NVM 140 to the demand read cache 327B, and to return demand data 812 specified in the submission 801 in response to a request 810 for the demand data from the CPU 112. The request 810 can be, for example, in the form of a memory read command using the CXL.mem protocol. In some embodiments, control logic 125 is further configured to transfer at least an unread portion 813 of the payload 811 to the device memory 420. Subsequent read/write operations 814 related to at least the portion 813 of the payload 811 can be between the CPU and the device memory 420 via the CXL.mem protocol.

Figure 8B:
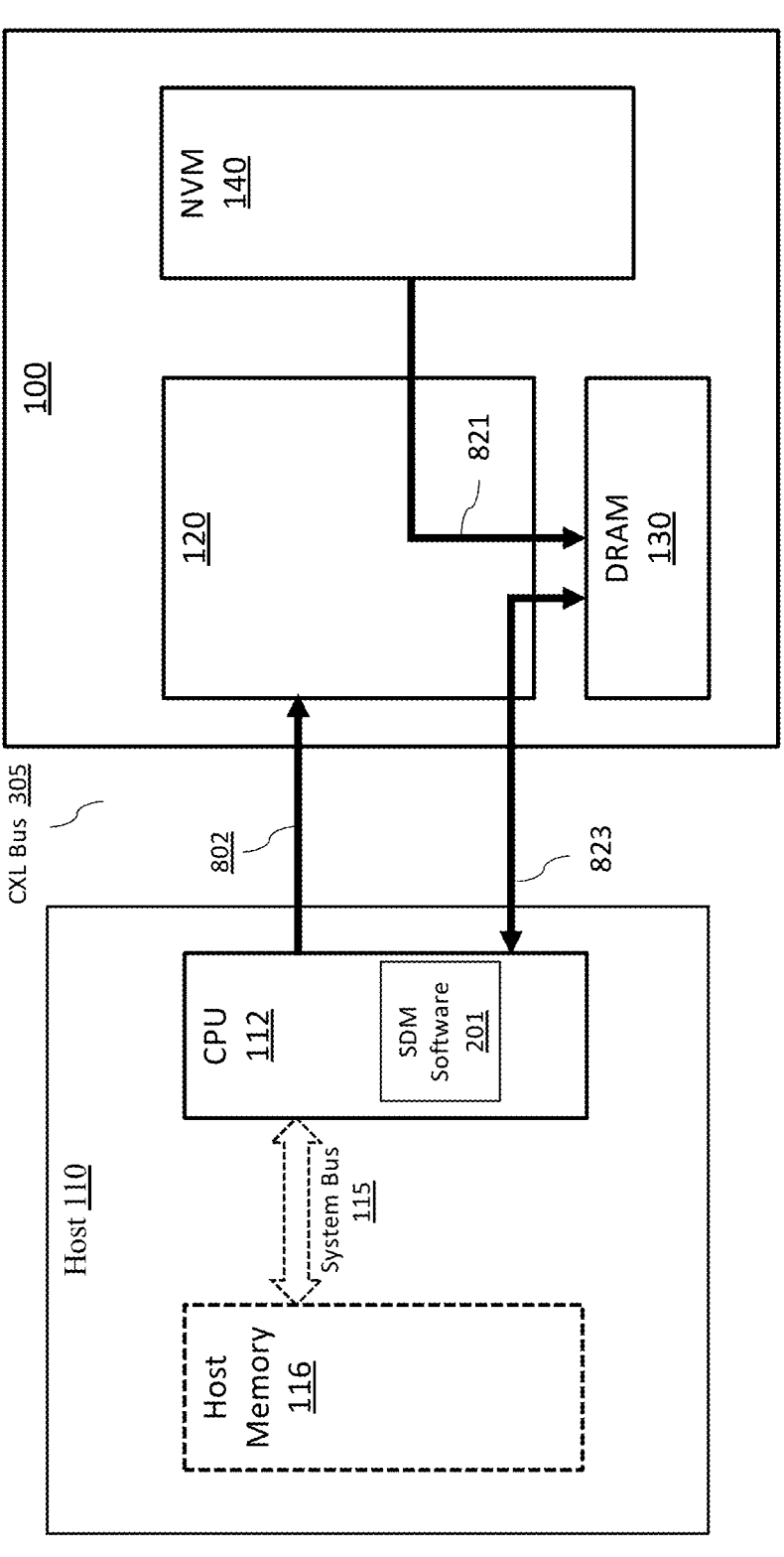

In some embodiments, as shown in FIG. 8B, in response to a second submission 802 for predictive read, control logic 125 is configured to transfer a payload 821 specified in submission 802 from the NVM 140 to the device memory 420. Subsequent read/write operations 823 related to the payload 821 can be between the CPU and the device memory 420 via the CXL.mem protocol.

Figure 9:
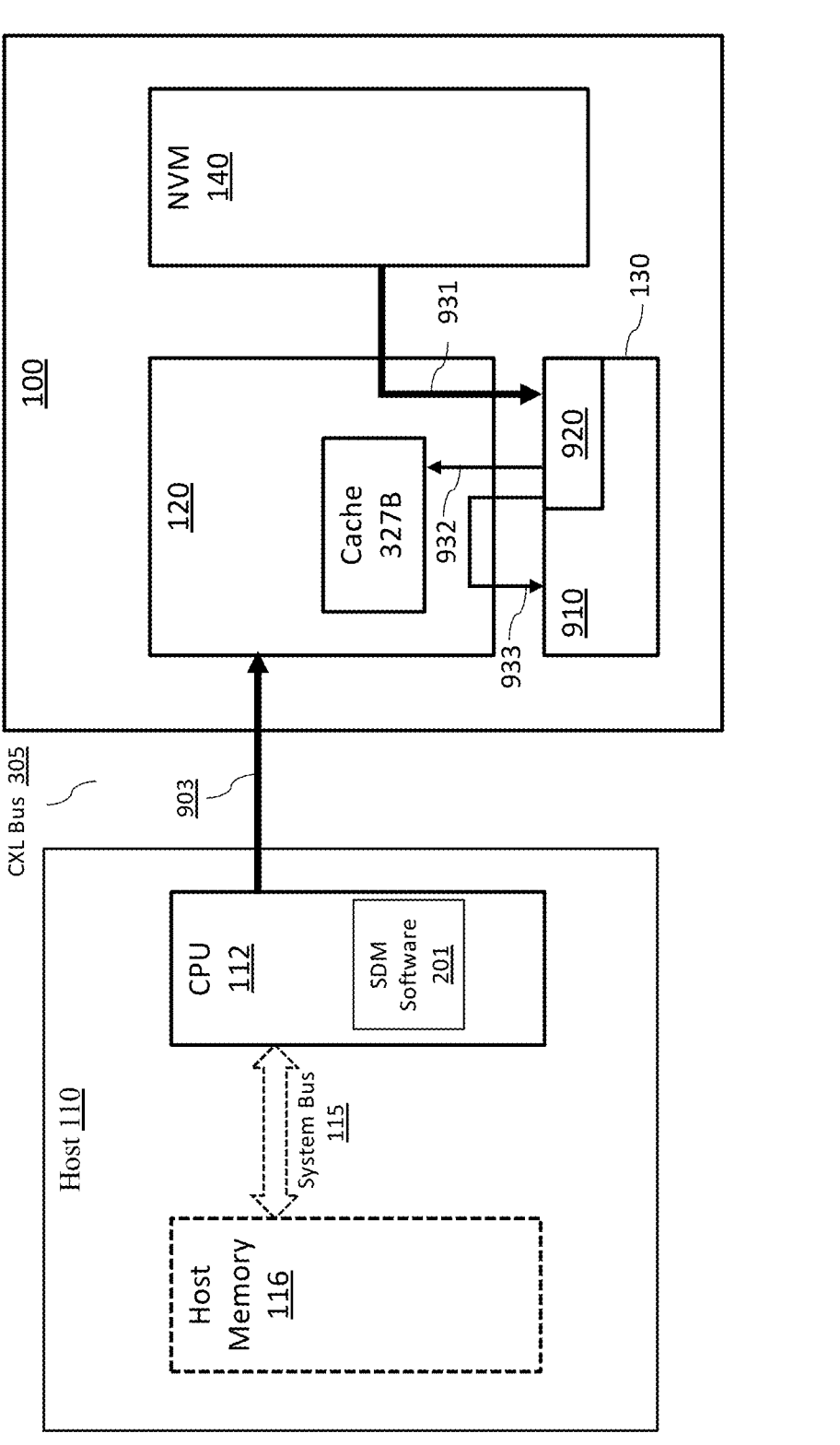

In some embodiments, as shown in FIG. 5, a physical memory space 500 associated with the local memory 130 includes a coherent memory space 420 accessible by the CPU 112 and a private memory space 450 hidden from the CPU 112. As shown in FIG. 9, the local memory 130 can be considered to include a memory portion (or device memory) 910 corresponding to the coherent memory space 420 and a memory portion (or private memory) 920 corresponding to the private memory space. In some embodiments, in response to a third submission 903 for speculative read, control logic 125 is configured to transfer a payload 931 specified in submission 903 from the NVM 140 to the private memory 920. Subsequently, when part or all of the payload 932 is specified in a submission for demand read, the part or all of the payload 932 is transferred from the private memory 920 to the demand read cache 327B. When part or all of the payload 933 is specified in a submission for predictive read, the part of all of the payload 933 is transferred from the private memory 920 to the device memory 910.

Figure 10A:
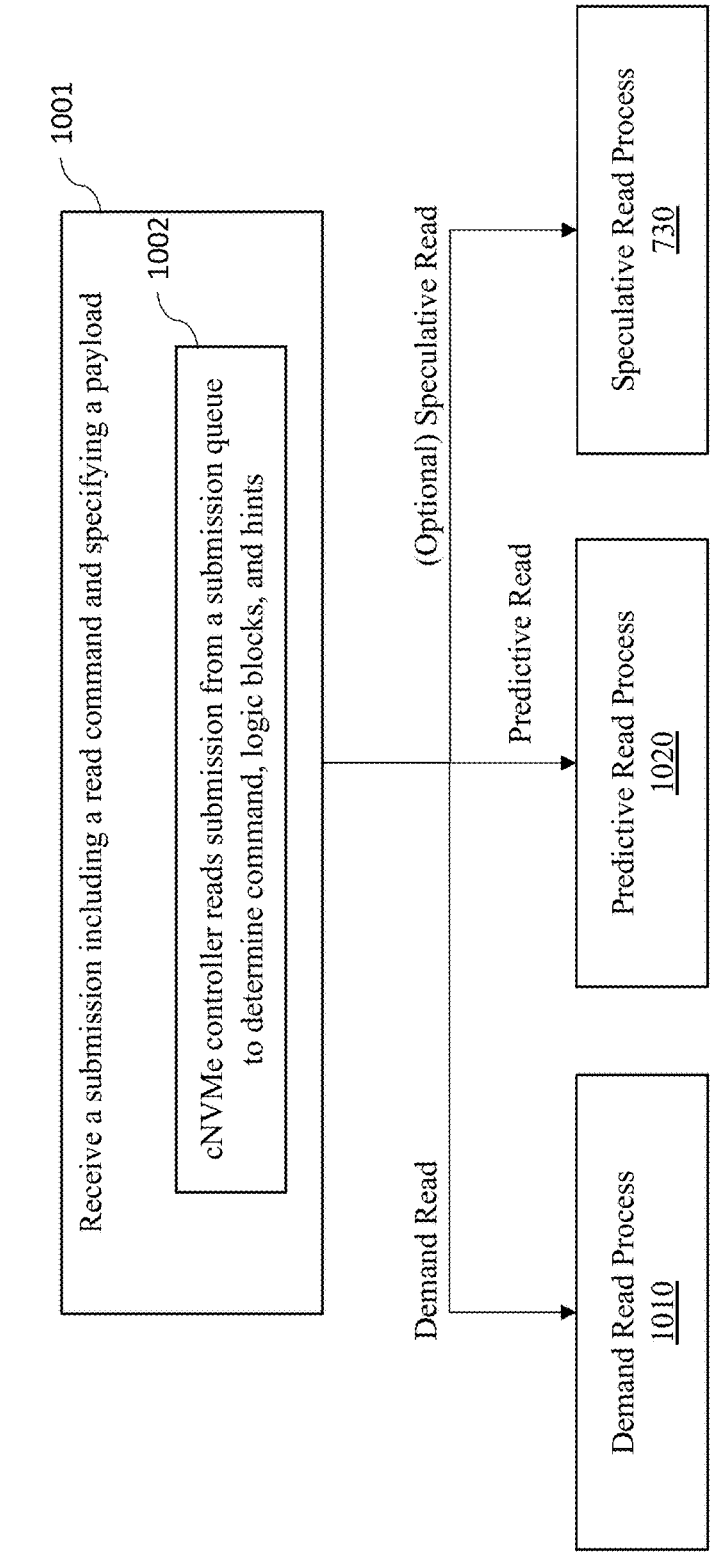
FIGS. 10A-10D are flowcharts illustrating quality of service (QOS) processed carried out by the memory expansion device in accordance with some embodiments.

FIG. 10A is a flowchart illustrating quality of service (QOS) process 1000 carried out by control logic 125 in response to a submission for a payload by the host 110 in accordance with some embodiments. As shown, QoS process 1000 includes receiving (1001) a submission (e.g., submission 600) including a read command (e.g., read command 611) and specifying a payload (e.g., payload 630). In some embodiments, receiving (1001) a submission includes the cNVMe controller 322 reading (1002) the submission (e.g., from the CMB cache 327A) to determine the command, payload specification (e.g., starting logical block address, and number of logical blocks), and hints included in the submission. cNVMe controller 322 then initiates one of at least two different processes depending on a priority of the submission. In some embodiments, the priority of the submission is determined based on which submission queue the submission has been written into.

For example, if the submission is determined to be of a first priority (e.g., the submission is to resolve a page fault at the host 110), a demand read process 1010 is carried out by control logic 125, and if the submission is determined to be of a second priority (e.g., the submission is to predictively fetch data from storage), a predictive read process 1020 is carried out by control logic 125. In some embodiments, CMX device 100 also facilitates a speculative read process 1030 in response to the submission being of a third priority (e.g., the submission is to prefetch data based on speculation that the data might be needed in a predetermined speculative time period in the future). In some embodiments, the submission is determined to be of the first priority, the second priority, or the third priority based on whether the submission is queued in a demand queue 531, a predictive queue 532, or a speculative queue 533.

Figure 10B:
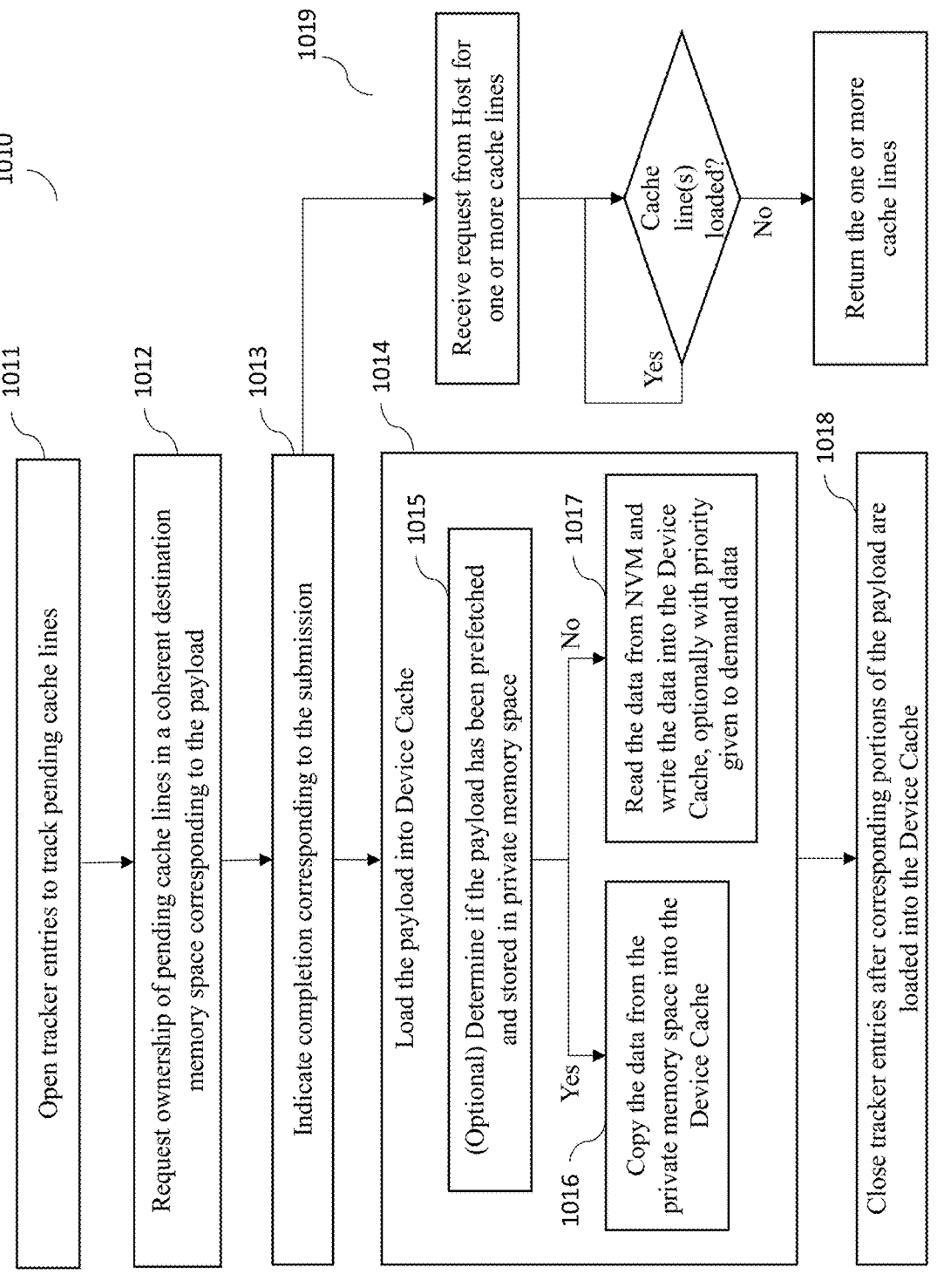

FIG. 10B is a flowchart illustrating a demand read process 1010 according to certain embodiments. As shown, process 1010 includes requesting (1012) ownership of pending cache lines (e.g., cache lines 421) corresponding to the payload 630, as specified in the submission (e.g., submission 630). In some embodiments, cNVMe controller 322 is configured to determine the pending cache lines after reading the submission and cache controller(s) 318 is configured to request ownership of the pending cache lines from home agent 350 using the cache coherency protocol of the coherent interconnect fabric 300. As shown in FIG. 10B, after acquiring the ownership of the pending cache lines, process 1010 proceeds to indicating (1013) completion of the submission by, for example, writing into a completion queue 560 of the CMB space 430. Process 1010 further includes opening (1011) tracker entries to track the pending cache lines, and loading (1014) the payload into the device cache. In some embodiments, cache controller(s) 318 includes and manages tracker entries associated, respectively, with the pending cache lines. In some embodiments, each logical block in the payload corresponds to one or more of the pending cache lines. In some embodiments, the pending cache lines correspond to cache lines (e.g., cache lines 421) in a coherent destination memory space accessible by the host 110, which could be the coherent memory space 420 provided by local memory 130, or, when local memory 130 is not available or provided, the coherent memory space 410 corresponding to host memory 116.

In some embodiments, as shown in FIG. 10B, loading (1014) the payload 630 into cache memory (or device cache) 127 (e.g., the demand read cache 327B) includes, optionally, determining if the payload has been prefetched and stored in private memory 920, and in response to the payload having been stored in private memory 920, copying the data from the private memory 920 to the demand read cache 327B. Otherwise, or if no such determination is made, loading (1014) the payload 620 includes reading the payload from the NVM subsystem 340 and writing the payload into the demand read cache 327.

As shown in FIG. 10B, process 1010 further includes closing (1018) tracker entries after corresponding portions of the payload are loaded in the device cache (e.g., demand read cache 327B). In some embodiments, the payload 630 is read from the NVM subsystem 340 logical block by logical block, and written into the demand read cache 327B cache line by cache line. Cache controller(s) 318 may close the tracker entries one by one as portions of the load corresponding to the pending cache lines are loaded into the demand read cache 327B one cache line at a time. Cache controller(s) 318 may also close the tracker entries one set at a time, so that cache controller(s) 318 would close one or more track entries associated with one or more pending cache lines corresponding to a logical block after the logical block is read from the NVM subsystem 340 and loaded into the demand read cache 327B.

As shown in FIG. 10B, indicating (1012) completion of the submission may trigger the CPU to send a request for at least the demand data, which could be sent before the demand data is loaded into the demand read cache 327B because indicating (1012) completion of the submission often occurs before the demand data is loaded in the demand read cache 327B. The CPU request for at least demand data in turn would trigger another process 1019, in which control logic 125, in response to receiving from the host 110 the request for at least the demand data, which could correspond to one or more cache lines, and would check whether one or more tracker entries associated with the one or more cache lines have been closed, indicating that the data corresponding to the one or more cache lines have been loaded in the demand read cache 327B. Based on whether the one or more tracker entries have been closed, control logic 125 would either return the data corresponding to the one or more cache lines in response to the request, or continue checking the one or more tracker entries and return the data once the one or more tracker entries are closed.

Figure 10C:
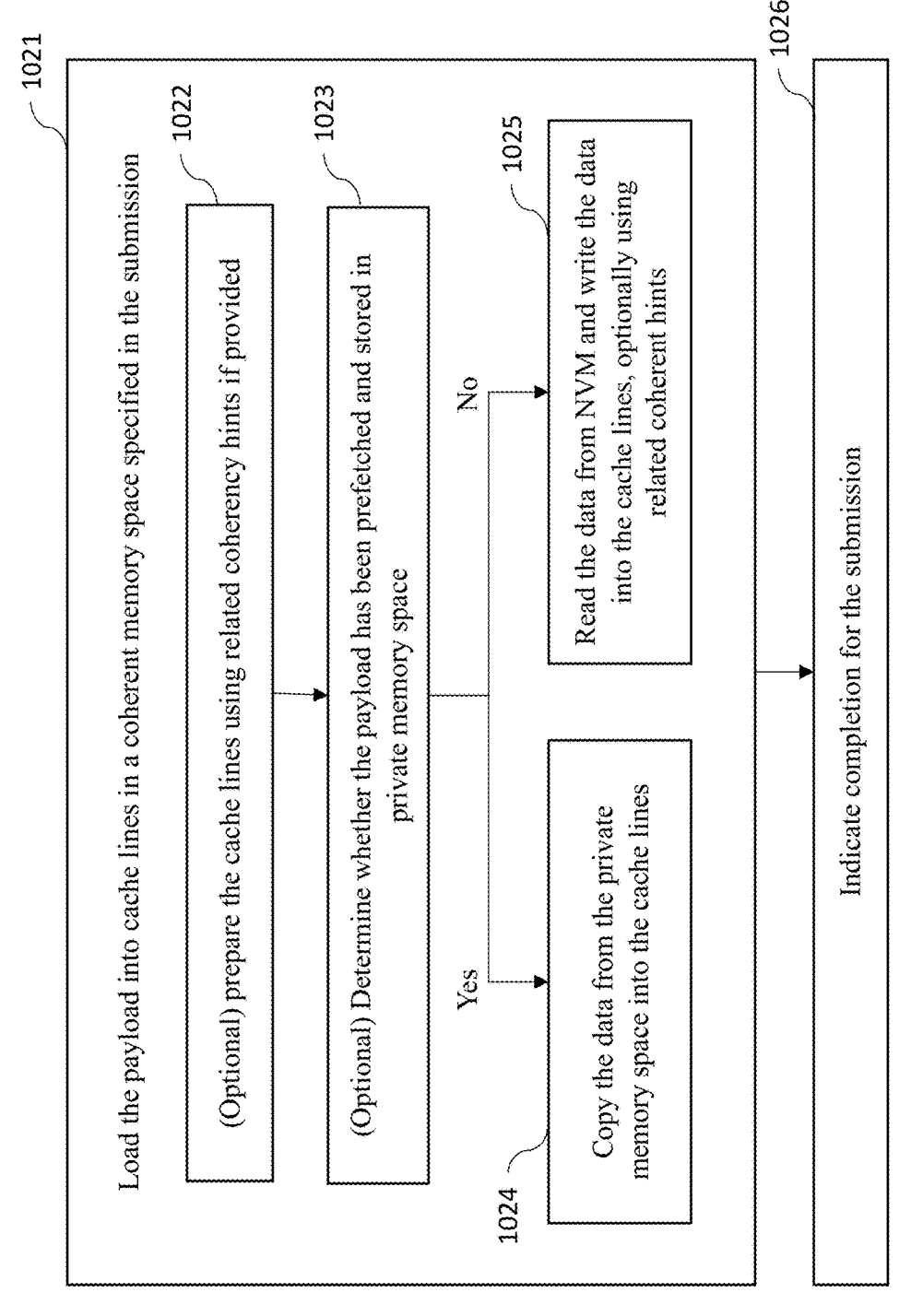

FIG. 10C is a flowchart illustrating a predictive read process 1020 according to certain embodiments. As shown, process 1020 includes loading (1022) the payload (e.g., payload 630) into corresponding cache lines (e.g., cache lines 422) in a destination coherent memory space (e.g., memory space 420), as specified in the submission. In some embodiments, the submission may include one or more first hints specifying how the corresponding cache lines should be prepared before the payload in loaded therein for increased performance. Thus, loading (1022) the payload into corresponding cache lines optionally includes preparing the cache lines using the one or more first hints. In some embodiments, CMX device 100 further facilitate speculative read processes and the payload for the current submission may have been prefetched in a prior speculative read process. Thus, process 1020 optionally includes determining whether part or all of the payload has been prefetched and stored in the private memory 920, and in response to an affirmative determination, copying part or all of the payload from the private memory into the cache lines in the destination coherent memory space. Otherwise, or if no such determination is made, or if only part of the payload is copied from the private memory, process 1020 includes reading (1025) part or all of the payload from the NVM subsystem 340, and writing the data into the corresponding cache lines. In some embodiments, the submission may include one or more second hints regarding how the payload should be read from the NVM subsystem 340 and/or written into the corresponding cache lines for increased performance, and reading (1025) part or all of the payload from the NVM subsystem 340, and/or writing the data into the corresponding cache lines are performed using the one or more second hints. Once the payload has been loaded into the cache lines specified in the submission, process 1020 further includes indicating completion for the submission by, for example, writing into a completion queue 560 of the CMB.

Figure 10D:
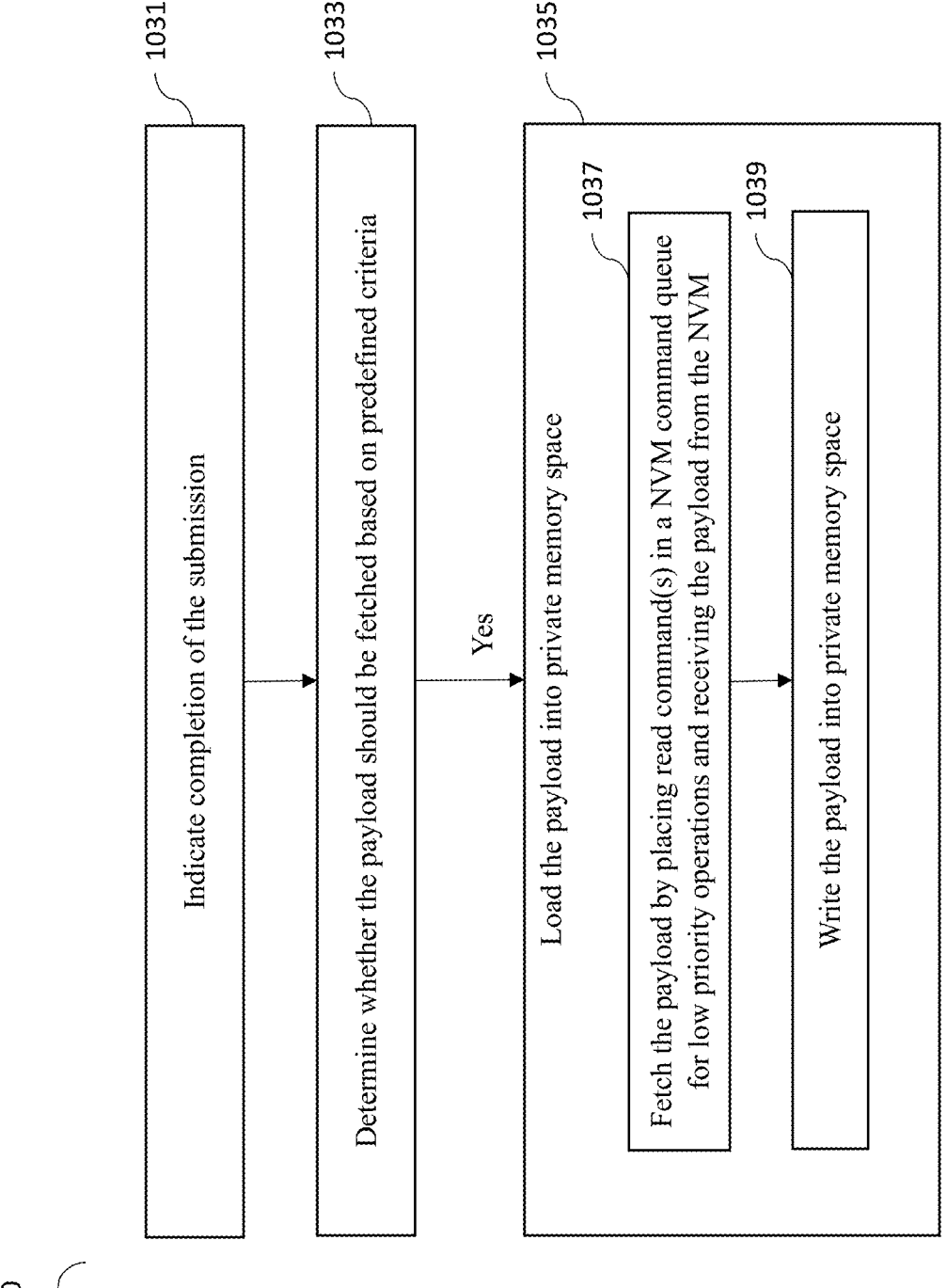

FIG. 10D is a flowchart illustrating a speculative read process 1030 according to certain embodiments. As shown, process 1030 includes indicating (1031) completion for the submission by, for example, writing into a completion queue 560 of the CMB, and determining (1033) whether the payload should be fetched based on predefine criteria. In some embodiments, the predefined criteria may include, for example, whether the payload can be fetched from the NVM subsystem 340 and loaded into the private memory 920 within a predetermined time period without significant negative impact on the performance of higher-priority processes pending at the CMX device 100. If the answer is affirmative, process 1030 proceeds to loading (1035) the payload into the private memory 920, which may include, fetching (1037) the payload from the NVM subsystem 340 by placing NVM read commands in a NVM command queue 753 for low priority operations and receiving the payload from the NVM subsystem 340, and writing (1039) the payload into the private memory 920.

Figure 11A:
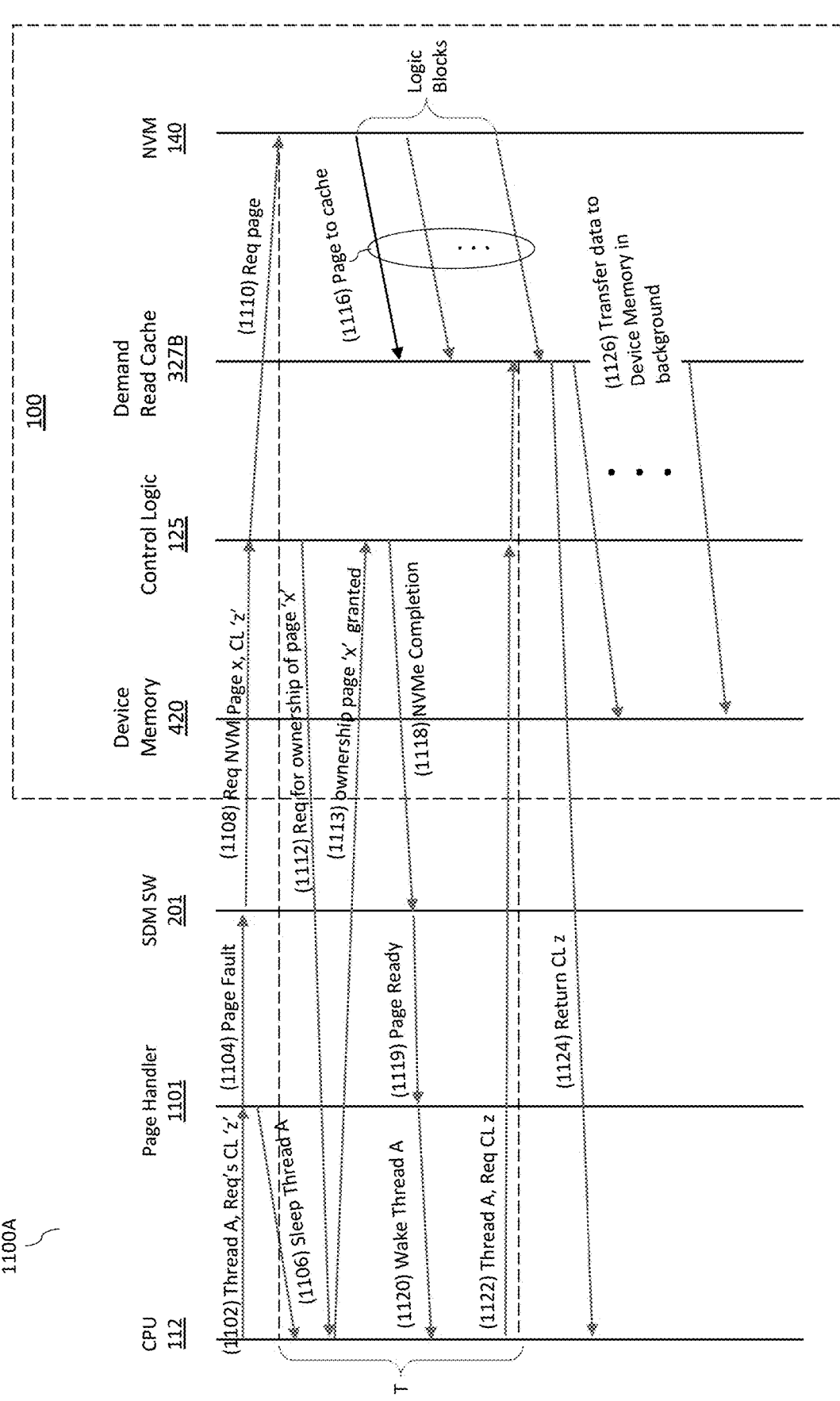
FIGS. 11A-11B are flow diagrams illustrating a page fault recovery process with reduced demand fetch latency in accordance with some embodiments.

FIG. 11A is a flow diagram illustrating a page fault recovery process 1100A with reduced demand fetch latency using CMX device 100, in accordance with some embodiments. As shown in FIG. 11A, when a thread (e.g., Thread A) of an application running on CPU 112 requests (1102) data (e.g., a cache line or CL 'z') that is not in the CPU cache 113 or host memory 116, a page handler 1101 running at the CPU 112 issues (1104) a page fault and puts (1106) the thread to sleep. In response, the SDM software (SW) SDM software 201 sends (1108) a request for the page (e.g., page x) containing CL 'z' by, for example, writing a submission into the demand queue 531 in the CMB space 430. Upon receiving the request, the CMXC 120 at the CMX device 100 starts two sub-processes concurrently or in parallel, a first sub-process to load page x into the device cache and a second sub-process to wake up Thread A. At least part of the first sub-process overlaps with at least part of the second sub-process during a time period T. So, instead of waiting until page x is loaded into the CPU cache before waking up the Thread A, the sub-process of waking up Thread A can be running while at least a portion of page x is being loaded from the NVM subsystem 340 to the demand read cache 327B.

The first sub-process is started by the control logic 125 commanding (1110) the NVM 840 to output page x, which includes the requested data or demand data (e.g., cache line 'z') and other cache lines. As page 'x' is being transferred (1116) from the NVM 840 to the demand read cache 327B, the control logic 125 performs the second sub-process by requesting (1112) ownership of the cache lines associated with page 'x', including CL 'z' from the home agent 350 at the CPU 112. Upon receiving (1113) acknowledgment from the CPU 112 that the ownership is granted, the control logic 125 notifies the SDM software 201 that the page is ready by, for example, writing (1118) a completion for submission in a completion queue in the CMB. In response, the SDM software 201 closes the loop by indicating (1119) to the page handler 1101 that the page is ready, causing the page handler 1101 to wake up (1120) Thread A, which then sends (1122) out a request to the control logic 125 to return the requested data (e.g., CL 'z'). In some embodiments, the requested data CL 'z' is transferred (1124) directly from the device cache to the CPU cache 113 using, for example, CXL.mem or CXL-.cache. At least an unread portion of the page x can be subsequently transferred (1126) to the device memory 420 at low priority in a background process. The CPU can then access any of the other cache lines via the CXL bus 305.

Figure 11B:
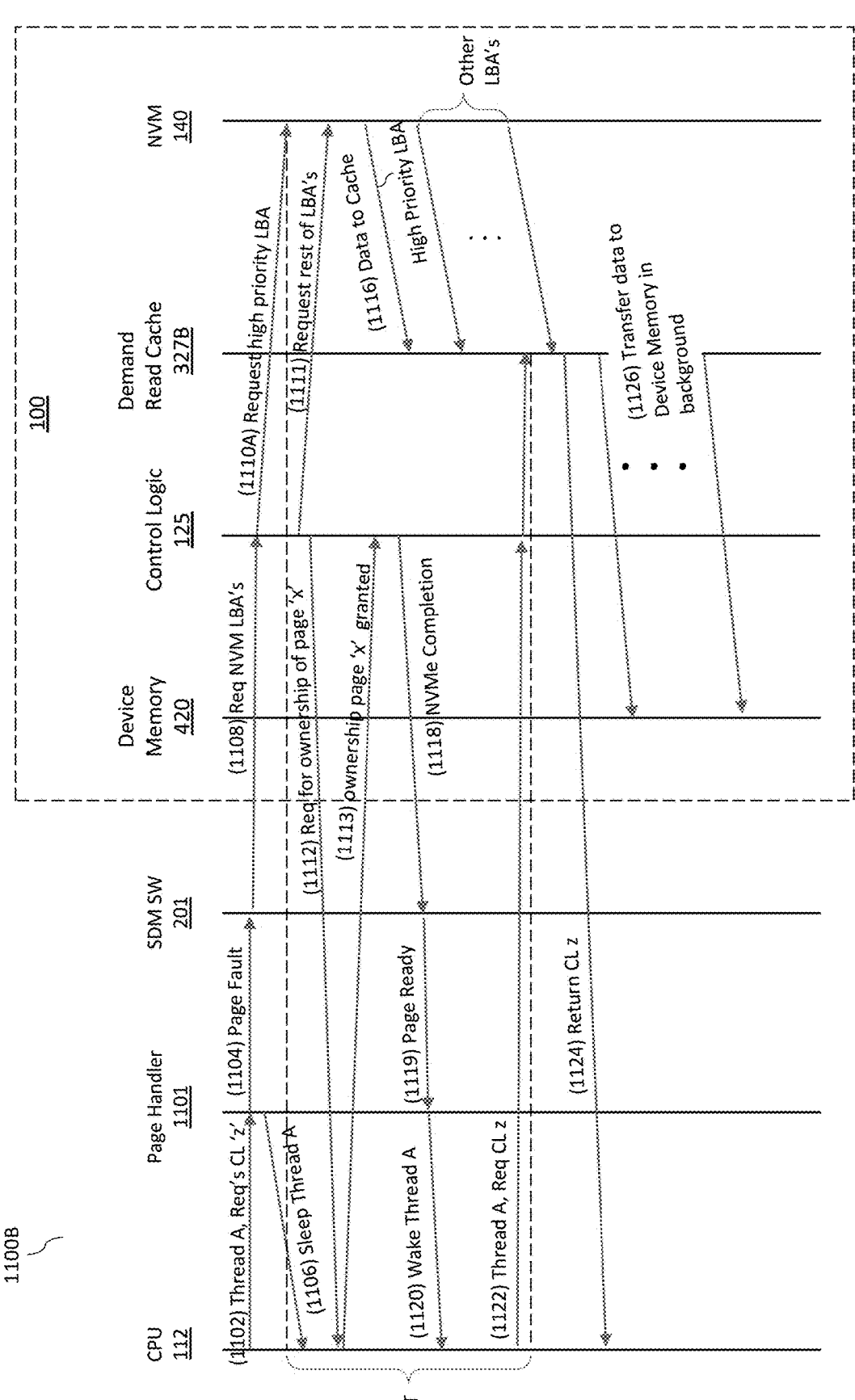

FIG. 11B is a flow diagram illustrating a page fault recovery process 1100B with further reduced demand fetch latency using CMX device 100, in accordance with some embodiments. As shown in FIGS. 11A and 11B, process 1100B is similar to process 1100A except that in process 1100B, when issuing commands to the NVM subsystem 340 to read the page from the NVM subsystem 340, control logic 125 would issue (1110A) the command corresponding to the high priority LBA for the logical block including the requested cache line "z" first, followed by the commands (1111) for the other LBA's. As a result, the logical block corresponding to the high priority LBA is output from the NVM subsystem 340 and loaded (1116) into the demand read cache 327B before the other logical blocks in page 'x.'

Figure 12:
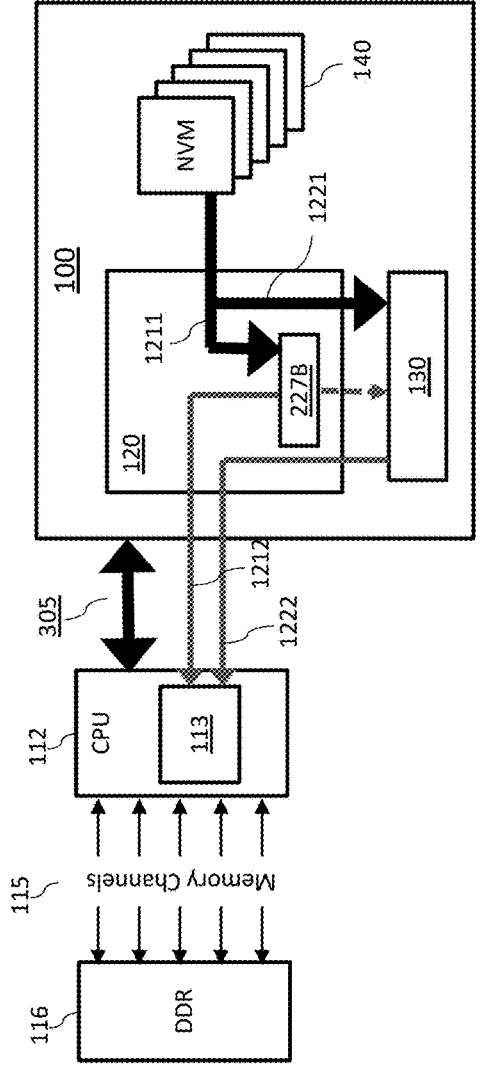
FIG. 12 is a diagram illustrating using a device cache to serve up demand data transferred from non-volatile memory (NVM) and a device DRAM to store low-priority data in accordance with some embodiments.
Figure 13:
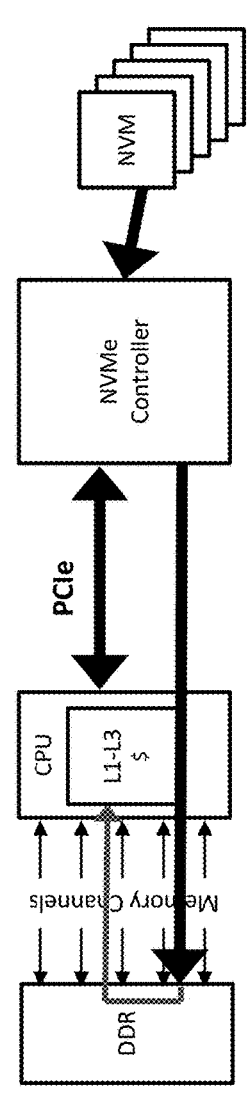
FIG. 13 is a diagram illustrating operations of a conventional memory expansion device coupled to a computer system via a PCIe bus.

Thus, as shown in FIG. 12, a requested page 1211 (e.g., a 4 kB page fill payload) is moved to the coherent demand read cache 327B, which is used to serve up critical demand data 1212 (e.g., a 64B cache line) via low latency cache-to-cache transfer to make the demand data immediately available to the CPU 112, while deprioritizing remaining low-priority data 1221 to prevent CPU data/coherency fabric congestion. As also shown in FIG. 12, all or a remainder of the page 1211 can be moved to the device memory 420, and memory access for the demand data (hot data) can be served 1212 from the demand read cache 327B while less critical data (warm data) is served 1222 from the device memory 420 with low latency, as shown in FIG. 12. In comparison, as shown in FIG. 13, a conventional NVMe-based memory expansion controller has no virtual memory and no device cache or memory. All data is fetched from the NVM coupled to an NVMe controller, and transferred to the host memory before the CPU can then access the data from the host memory, resulting in increased latency for the demand data and CPU data/coherency fabric congestion.

Figure 14:
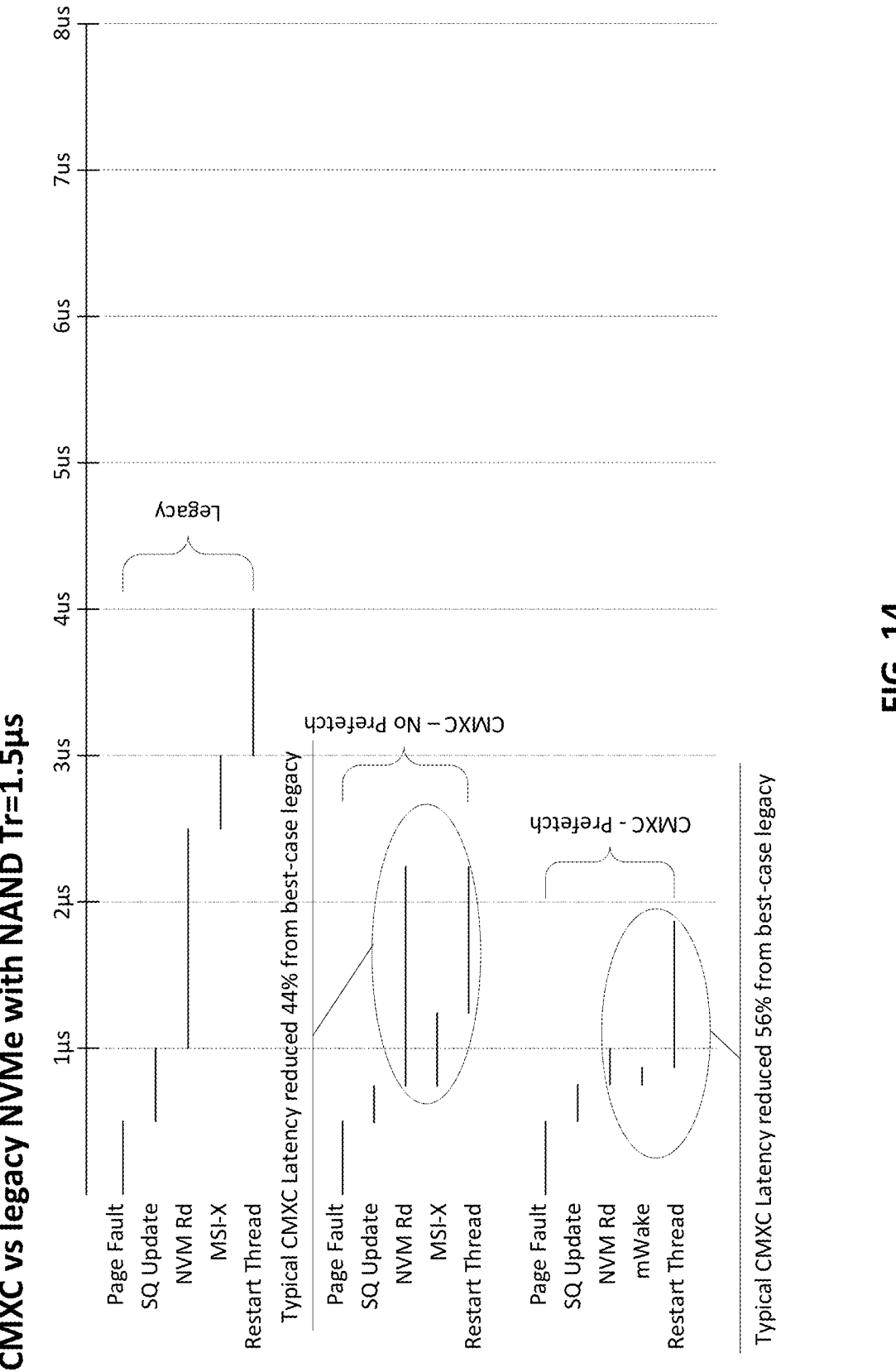
FIG. 14 is a timing diagram illustrating some of the advantages of the memory expansion device, in accordance with some embodiments.

FIG. 14 is a timing diagram illustrating some of the advantages of CMX device 100, in accordance with some embodiments. As shown, using process 1100A or 1100B, the time required to obtain demand data by a thread after the page fault is reduced by about 44% when message signal interrupt (MSI) is used to wake up the thread, if the page has not been prefetched and stored in private memory 920. In the case when the page has been prefetched and stored in private memory 920, the time required to obtain demand data by a thread after the page fault is reduced by about 56%, especially when mWake—a mechanism in the CPU that allows software to monitor a submission queue and wake up the thread when there is an update of a head/tail pointer—is used to wake up the thread.

Figure 15:
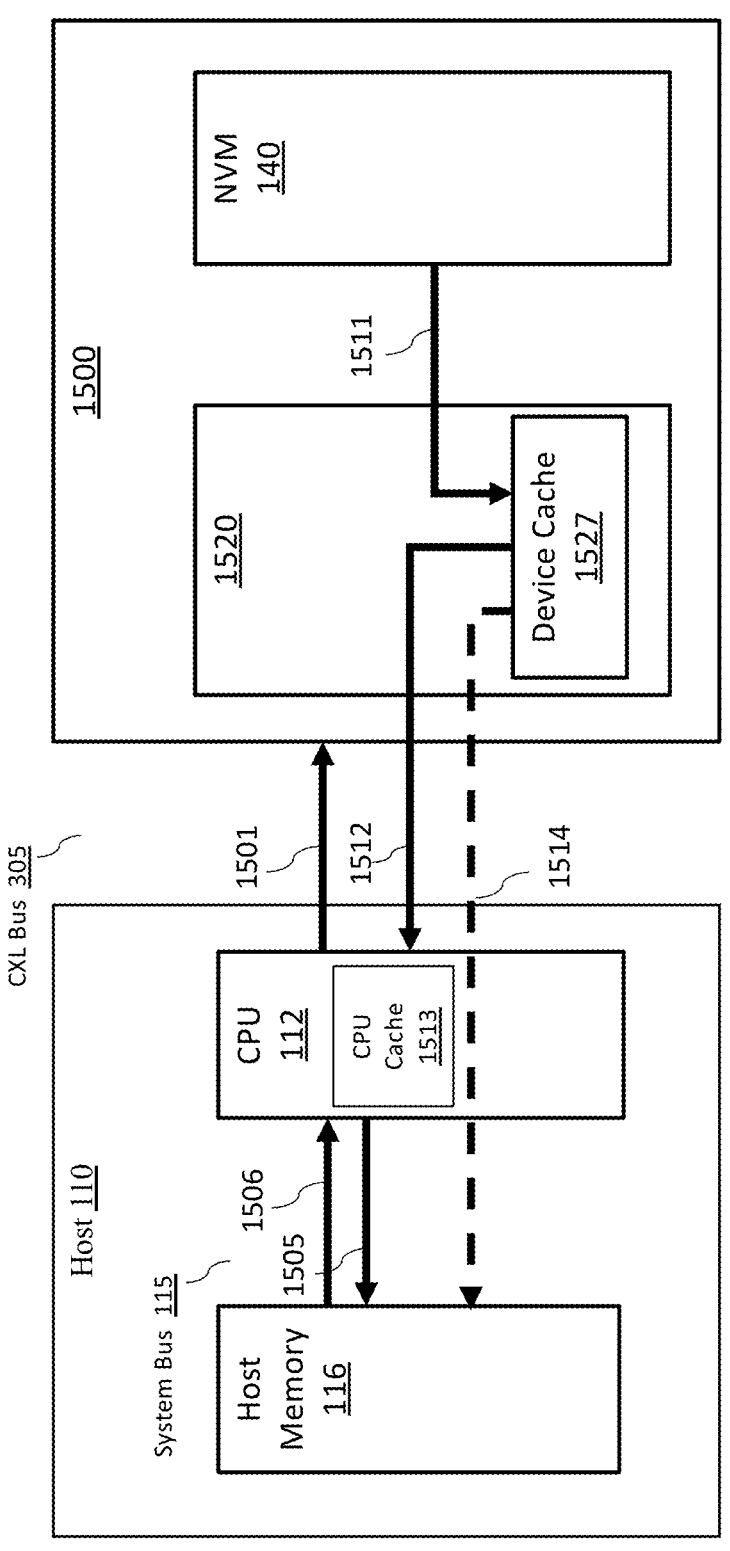
FIG. 15 illustrates operations of a memory expansion device in accordance with some embodiment.

FIG. 15 illustrates an operation of a CMX device 1500 having a CMXC 1520, which includes or is coupled to a device cache (or demand read cache) 1527, in accordance with some embodiments. In some embodiments, CMX device 1500 is similar to CMX device 100 except that CMX device 1500 does not provide a local DRAM memory to store payloads and/or related logic controlling data transfers to or from the local DRAM memory. In some embodiments, the control logic in the CMXC 1520 is configurable to: receive a submission 1501 from the CPU 112 via the CXL bus 305; read the payload 1502 from the non-volatile memory 140; load the payload 1511 into the device cache 1527; and transfer at least requested portion 1512 of the payload from the device cache 1527 to the CPU 112 via the CXL bus 305; and transfer at least an unrequested portion 1514 of the payload to a dynamic random access memory (DRAM) (e.g., host memory 116) accessible by the CPU 112 for memory read and write operations via a memory channel. The requested data 1512 is transferred from the device cache to the CPU 112 via the dedicated link (e.g., CXL bus 305) without going through a memory channel (e.g., the system bus 115).

In some embodiments, the at least unrequested portion 1514 of the payload is transferred to the host memory 116 in one or more background operations without specific requests from the CPU 112. The CPU 112 can subsequently access the at least unrequested portion 1514 of the payload if needed by issuing a read command (1505) to the host memory 316, which causes the host memory 316 to output the data to the CPU via the memory channel or system bus 115.

Thus, CMX device 1500 provides improved SDM request path and dedicated backchannel between the demand read cache 1527 and the NVM 340. Demand data can be transferred directly between the demand read cache 1527 and the CPU 112, while low priority data is opportunistically moved into the host DRAM 116. In some embodiments, CMX device 1500 can be used as a direct replacement for a conventional SDM (e.g., NVMe) expansion device and to provide improved performance over the conventional SDM expansion device for all supported workloads. The CMX device 1500 also supports additional workloads not viable with the conventional SDM expansion device.

Figure 16:
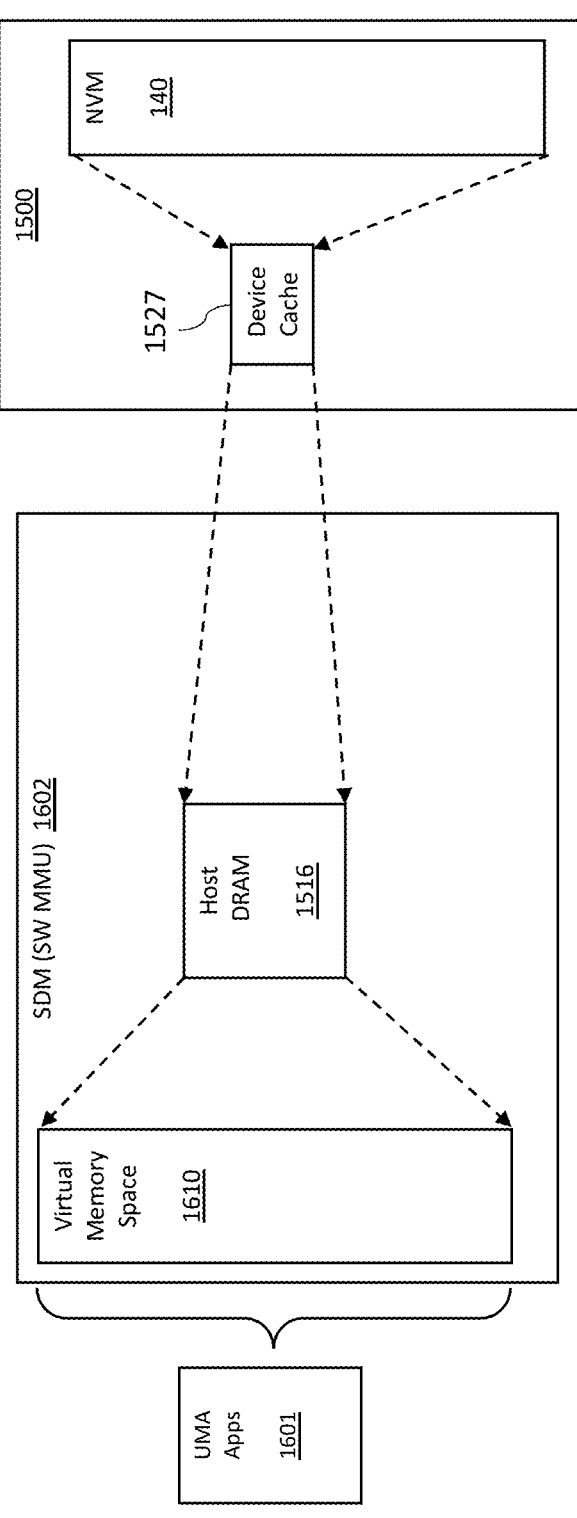
FIG. 16 illustrates a memory map of a computer system in accordance with some embodiments.

FIG. 16 illustrates a memory map 1600 of a computer system including CMX device 1500 in accordance with some embodiments. As shown in FIG. 16, SDM software 1602 pools the memory and storage resources in the computer system together and presents them to the CPU 112 as virtual memory 1610 accessible by one or more unified memory access (UMA) applications 1601 running at the CPU 112. For example, the NVM 160 may correspond to a 16 TB virtual memory space that is managed by the SDM software 1602, and data can be moved between the NVM 140 and the Host DRAM 116 via the coherent demand read cache 1527. Thus, the CMX device 1500 allows the SDM to migrate data from the NVM 140 into host memory 116 through the device cache 1527. As discussed below, the CMXC controller 1520, together with the local coherent demand read cache 1527, provides enhanced performance through SDM intelligent pre-fetching, and overlapping of a data fetch process with a process of waking up the request thread.

Figure 17:
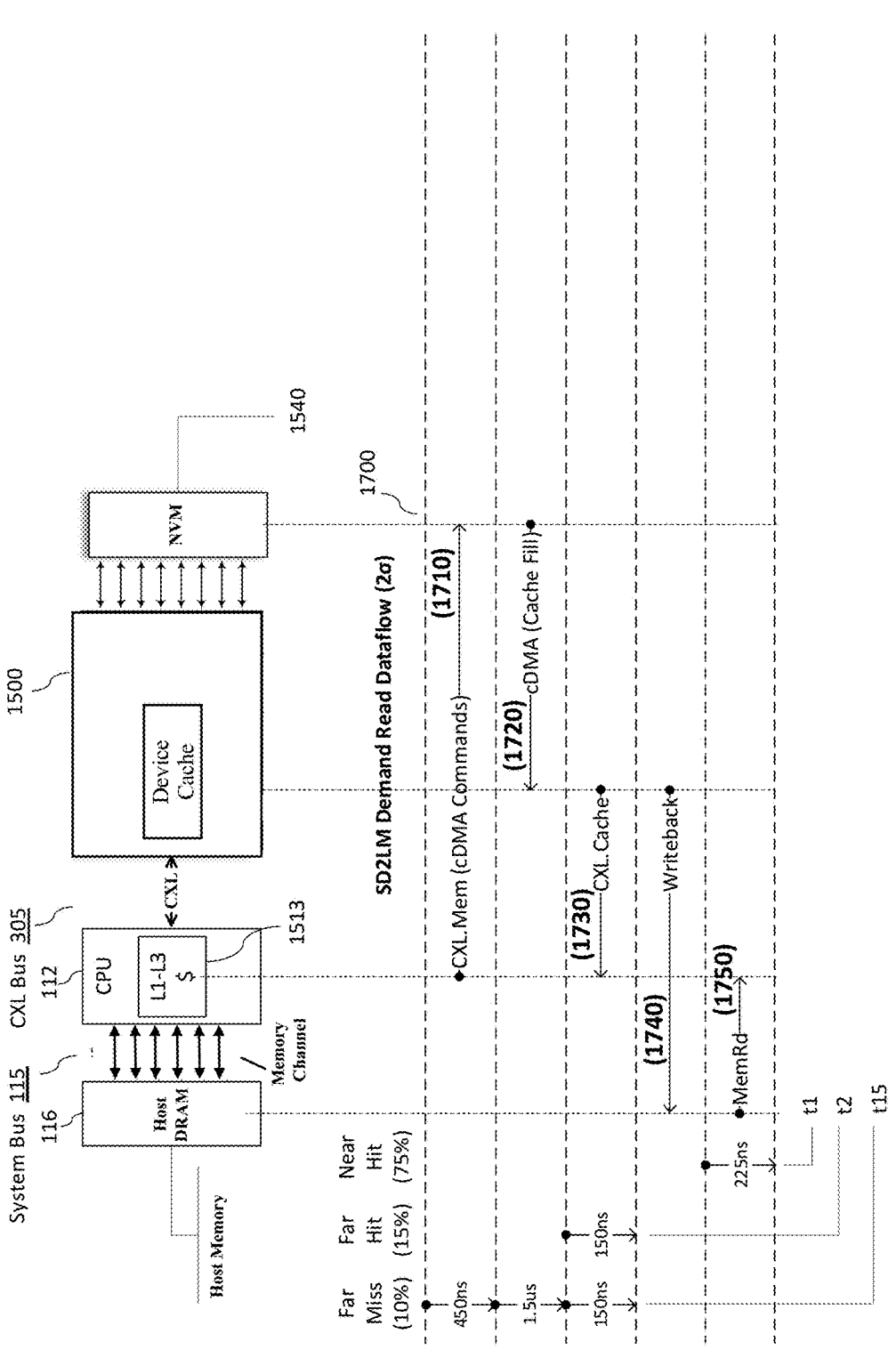
FIG. 17 is a diagram illustrating operations of a memory expansion device associated latencies in accordance with some embodiments.

In some embodiments, as shown in FIG. 17, a process 1700 of transferring data from the NVM 140 to the CPU comprises receiving (1710) from the SDM 1602 running on the CPU 112 a request to access data at a location in a memory map or to retire an NVM payload. In some embodiments, the request can be sent as one or more cDMA commands based on the CXL.mem protocol or an NVMe submission. As shown in FIG. 17, process 1700 further comprises loading (1720) an NVM page (or NVM payload) including the demand data into the coherent demand read cache 1527 by, for example, the CMXC 1520 using, for example, a cDMA cache fill process. Process 1700 further comprises conducting (1730) a direct cache-to-cache transfer of the demand data to a CPU cache 1513 (e.g., L1-L3 cache) based on, for example, the CXL.cache protocol, and syncing (1740) additional unused data in the NVM page to the host memory 116 in a low-priority background writeback process. The additional data can then be read (1750) by the CPU 112 via a memory channel (e.g., system bus 115)

In some embodiments, as shown in FIG. 17, a near hit latency t1 (e.g., the latency of fetching the demand data directly from host memory 116) is about, for example, 225 nano seconds (ns), a far hit latency t2 (e.g., the latency of fetching the demand data directly from the demand read cache 1527) is about, for example, 150 ns, and a far miss latency t3 (e.g., the latency of transferring the data from the NVM 140 to the demand read cache 1527 and from the demand read cache 1527 to the CPU cache 1513) is about, for example, 2100 ns. Assuming a 75% probability that the demand data is readily available in the host memory 116, a 15% probability that the demand data is readily available in the demand read cache 1527, and a 10% probability that the demand data is in neither the host memory 116 nor the demand read cache 1527 and thus has to be transferred from the NVM 140, a resulting average latency for fetching the demand data would be about, for example, 410 ns.

Figure 18A:
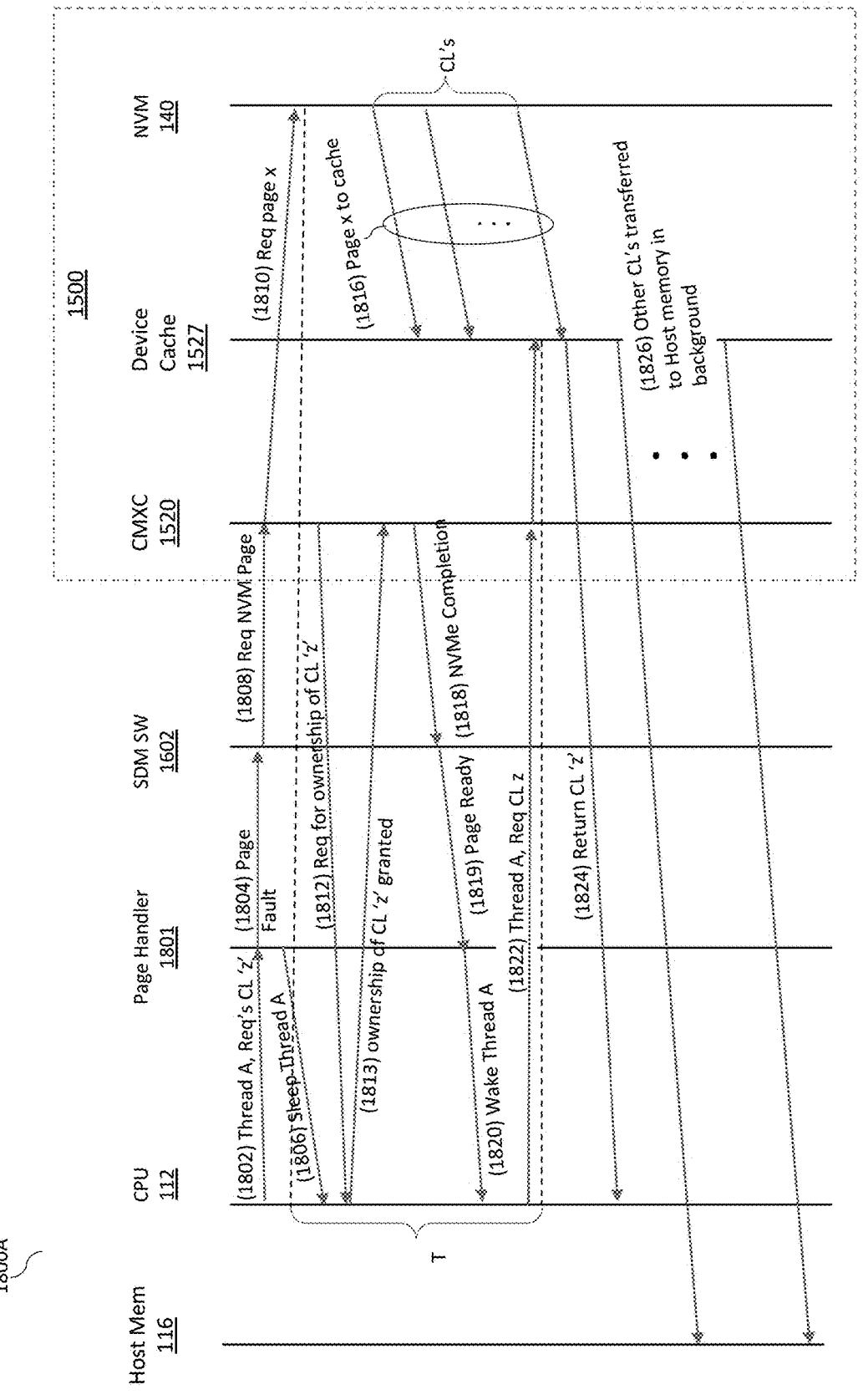
FIGS. 18A-18B are flow diagrams illustrating a page fault recovery process with reduced demand fetch latency in accordance with some embodiments.

FIG. 18A is a flow diagram illustrating a page fault recovery process 1800A with reduced demand fetch latency using CMX device 1500, in accordance with some embodiments. As shown in FIG. 18A, when a thread (e.g., Thread A) of an application running on CPU 112 requests (1802) data (e.g., a cache line or CL 'z') that is not in the CPU cache 1513 or host memory 116, a page handler 1801 running at the CPU 112 issues (1804) a page fault and puts (1806) the thread to sleep. In response, the SDM software (SW) SDM software 201 sends (1808) a request for the page (e.g., page x) containing CL 'z' by, for example, writing a submission into a demand queue in CMX device 1500. In some embodiments, in addition to the demand read cache 1527, CMX device 1500 further includes additional cache memory (e.g., SRAM or HBM) for storing demand queues or submission queues (e.g., one or more demand queues 531, one or more predictive queues 532 and one or more speculative queues 533, and one or more completion queues completion queue 560) accessible by CPU 112. Upon receiving the request, the CMXC 1520 at the CMX device 1500 starts two sub-processes concurrently or in parallel, a first sub-process to load page x into the device cache 1527 and a second sub-process to wake up Thread A. At least part of the first sub-process overlaps with at least part of the second sub-process. So, instead of waiting until page x is loaded into the CPU cache before waking up the Thread A, the sub-process of waking up Thread A can be running while at least a portion of page x is being loaded from the NVM 140 to the demand read cache 1527.

The first sub-process is started by CMXC 1520 commanding (1810) the NVM 840 to output page x, which includes the requested data or demand data (e.g., cache line 'z') and other cache lines. As page 'x' is being transferred (1816) from the NVM 840 to the demand read cache 327B, the CMXC 1520 performs the second sub-process by requesting (1812) ownership of the cache lines associated with page 'x', including CL 'z' from the home agent 350 at the CPU 112. Upon receiving (1813) acknowledgment from the CPU 112 that the ownership is granted, CMXC 1520 notifies the SDM software 201 that the page is ready by, for example, writing (1818) a completion for submission in a completion queue in the CMB. In response, the SDM software 201 closes the loop by indicating (1819) to the page handler 1801 that the page is ready, causing the page handler 1801 to wake up (1820) Thread A, which then sends (1822) out a request to CMXC 1520 to return the requested data (e.g., CL 'z'). In some embodiments, the requested data CL 'z' is transferred (1824) directly from the device cache to the CPU cache 113 using, for example, CXL.mem or CXL.cache. At least an unread portion of the page x can be subsequently transferred (1826) to the host memory 116 at low priority in a background process. The CPU 112 can then access any of the other cache lines via the system bus 115.

Figure 18B:
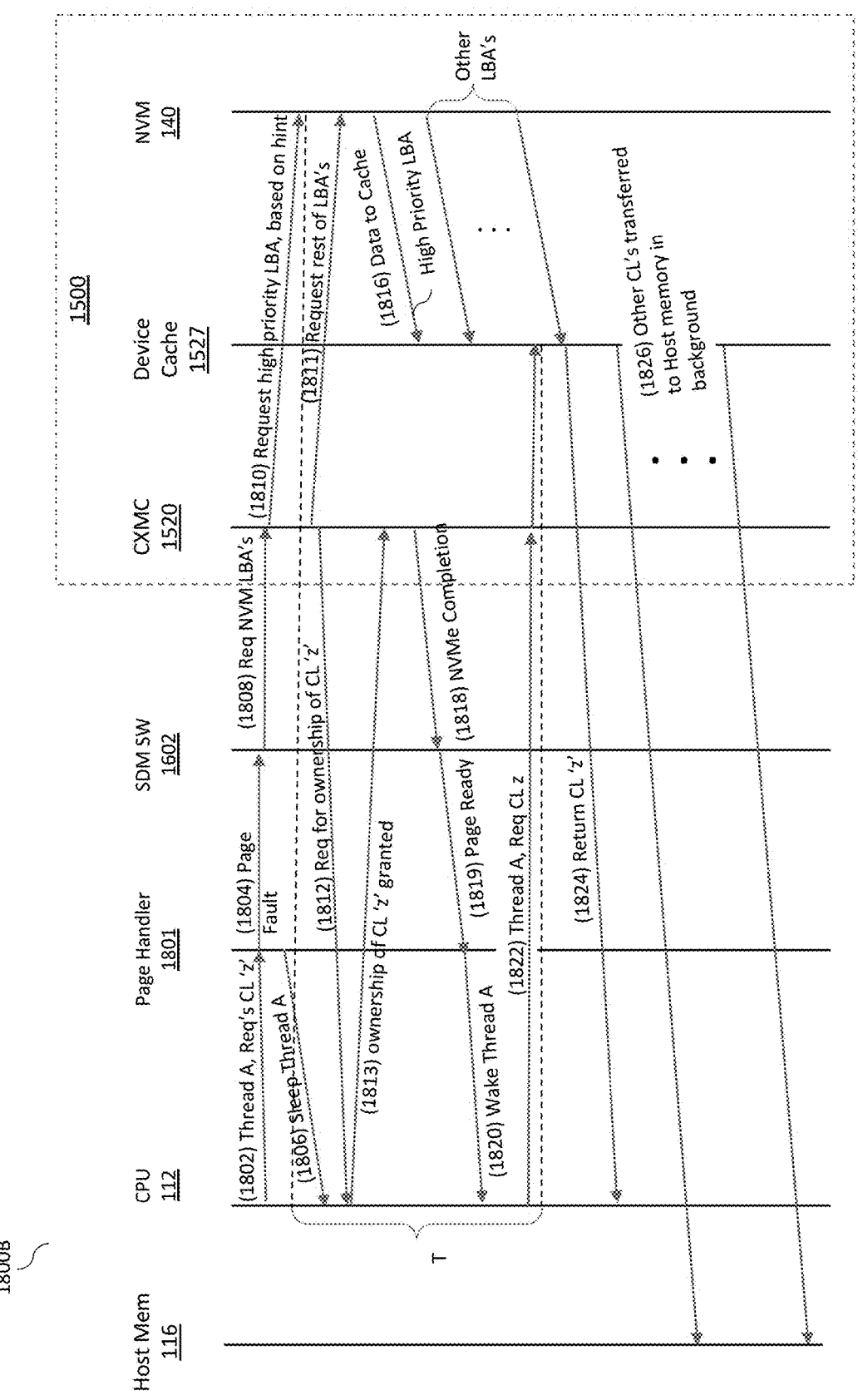

FIG. 18B is a flow diagram illustrating a page fault recovery process 1800B with further reduced demand fetch latency using CMX device 1500, in accordance with some embodiments. As shown in FIGS. 18A and 18B, process 1800B is similar to process 1800A except that in process 1800B, when issuing commands to the NVM subsystem 340 to read the page from the NVM subsystem 340, CMXC 1520 would issue (1810A) the command corresponding to the high priority LBA for the logical block including the requested cache line "z" first, followed by the commands (1811) for the other LBA's. As a result, the logical block corresponding to the high priority LBA is output from the NVM subsystem 340 and loaded (1816) into the demand read cache 1527 before the other logical blocks in page 'x.''

Figure 19:
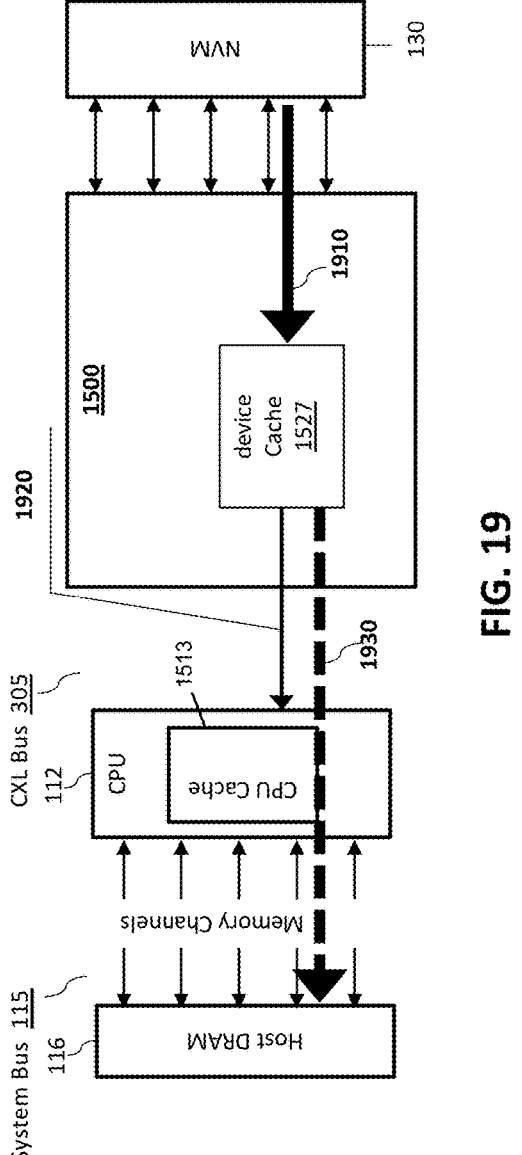
FIG. 19 is a diagram illustrating using a device cache to serve up demand data transferred from non-volatile memory (NVM) and transferring low-priority data to host memory in accordance with some embodiments.
Figure 20:
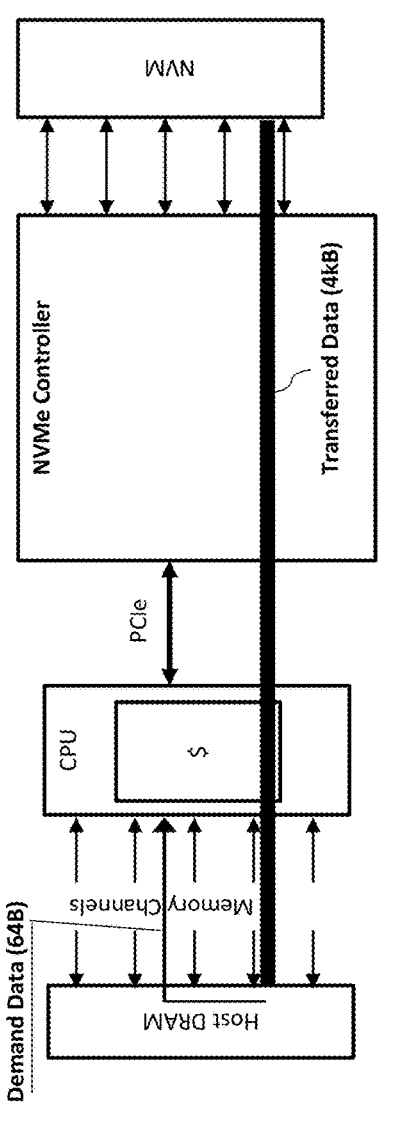
FIG. 20 is a diagram illustrating operations of a conventional memory expansion device coupled to a computer system via a PCIe bus.

The CMX device 1500 has several advantages over conventional software-defined memory (SDM) based on NVMe. For example, as shown in FIG. 19, the coherent device cache 1527 is used to serve up critical demand data 1920 via low latency cache-to-cache transfer, while deprioritizing remaining low-priority data 1930 to prevent CPU data/coherency fabric congestion. In comparison, as shown in FIG. 20, conventional NVMe based solution requires the full 4 KB page from a NVM be transferred from the NVM to the host DRAM before the application requesting the demand data can access the demand data via the host memory channel, resulting in increased latency for the demand data and CPU data/coherency fabric congestion.

It will be understood that, although the terms first, second, etc., are, in some instances, used herein to describe various elements, these elements should not be limited by these terms. These terms are only used to distinguish one element from another. For example, a first UV lamp could be termed a second UV lamp, and, similarly, a second UV lamp could be termed a first UV lamp, without departing from the scope of the various described embodiments. The first widget and the second widget are both widget, but they are not the same condition unless explicitly stated as such.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A memory expansion device operable in a computer system, the computer system including a host computer (host) and a dedicated bus, the memory expansion device comprising:
   interface circuitry configured to communicate with the host via the dedicated bus based on a predefined protocol;
   a non-volatile memory (NVM) subsystem;
   local memory providing a coherent memory space accessible by the host;
   cache memory; and
   control logic coupled to the interface circuitry the cache memory, and the NVM subsystem, wherein the control logic is configurable to:
      receive a submission from the host, the submission including a read command and a payload specification in the NVM subsystem;
      determine a priority of the submission based on the payload specification, wherein the submission is of a first priority if the submission is to resolve a page fault at the host, the submission is of a second priority if the submission is to fetch data from storage, and submission is of a third priority if the submission is to prefetch data from storage; and
      performing a read process of a plurality of read processes in response to determining the priority of the submission, wherein the read process is based on the priority of the submission.

2. The memory expansion device of claim 1, further comprising a local memory coupled to the control logic and providing a destination space.

3. The memory expansion device of claim 2, further comprising a controller memory buffer (CMB) including submission queues, accessible by the host, the submission queues including at least a first submission queue for queuing submission of the first priority and at least a second submission queue for queuing submissions of the second priority, wherein the CMB corresponds to a CMB memory space in the local memory.

4. The memory expansion device of claim 3, further comprising a cNVMe controller to determine the read command, a payload from the payload specification, and one or more hints of the submission, wherein the cNVME controller initiates one or more of the read processes.

5. The memory expansion device of claim 4, wherein the read process is a demand read process implemented by cNVMe controller in response to determining the submission is of the first priority, the demand read process comprising requesting ownership of cache lines corresponding to the payload specification in response to reading submission.

6. The memory expansion device of claim 5, the demand read process further comprising indicating completion of the submission after acquiring ownership of the cache lines and loading a payload of the payload specification to cache memory, the cache lines corresponding to a coherent destination memory space in local memory accessible by the host.

7. The memory expansion device of claim 4, wherein the one or more hints specify how the corresponding cache lines are prepared before the payload is loaded.

8. The memory expansion device of claim 7, wherein the read process is a predictive read process implemented by cNVMe controller in response to determining the submission is of the second priority, the predictive read process comprising:
   requesting ownership of cache lines corresponding to the payload specification in response to reading the submission;
   preparing the cache lines based on the one or more hints; and
   determining whether the payload has been prefetched and stored in a private memory space of the local memory.

9. The memory expansion device of claim 8, the predictive read process comprising loading a portion of the payload from the private memory into the cache lines corresponding to a coherent destination memory space.

10. The memory expansion device of claim 9, wherein the portion of the payload is a first portion, the predictive read process comprising:
   reading a second portion of the payload from the NVM subsystem; and
   writing the second portion of the payload to the corresponding cache lines.

11. The memory expansion device of claim 10, where in at least a first hint of the one or more hints is used to load the first portion and at least a second hint of the one or more hints is used to load the second portion.

12. The memory expansion device of claim 3, wherein the read process is a speculative read process in response to determining the submission is of the third priority, the speculative read process comprising determining whether to fetch a payload of the payload specification based on predefined criteria.

13. The memory expansion device of claim 12, wherein the speculative read process comprises:

determining that the payload can be fetched from the NVM subsystem and loaded into a private memory of the local memory within a predetermined time period defined by the predefined criteria; and loading the payload into the private memory by fetching the payload from the NVM subsystem using NVM read commands.

14. A memory expansion device operable in a computer system, the computer system including a host computer (host) and a dedicated bus, the memory expansion device comprising:

interface circuitry configured to communicate with the host via the dedicated bus based on a predefined protocol;

a non-volatile memory (NVM) subsystem;

local memory providing a coherent memory space accessible by the host;

cache memory; and control logic coupled to the interface circuitry the cache memory, and the NVM subsystem, wherein the control logic is configurable to:

receive a submission from the host, the submission including a read command and a payload defined by a payload specification in the NVM subsystem;

determine a priority of the submission based on the payload specification, wherein the submission is of a first priority if the submission is to resolve a page fault at the host, the submission is of a second priority if the submission is to fetch data from storage, and submission is of a third priority if the submission is to prefetch data from storage; and performing a read process of a plurality of read processes in response to determining the priority of the submission, wherein the read process is based on the priority of the submission and is one or more of a demand read process, a predictive read process, and a speculative read process, and each of the read processes includes indicating completion of the submission.

15. The memory expansion device of claim 14, wherein the read process is the demand read process in response to determining the submission is of the first priority, the demand read process comprising:

requesting ownership of cache lines corresponding to the payload specification in response to reading submission; and indicating completion of the submission after acquiring ownership of the cache lines and loading a payload of the payload specification to cache memory, the cache lines corresponding to a coherent destination memory space in local memory accessible by the host.

16. The memory expansion device of claim 14, wherein the read process is the predictive read process in response to determining the submission is of the second priority, the predictive read process comprising:

requesting ownership of cache lines corresponding to the payload specification in response to reading the submission;

preparing the cache lines based on one or more hints; and determining a portion of the payload has been prefetched and stored in a private memory space of the local memory; and loading a portion of the payload from the private memory into the cache lines corresponding to a coherent destination memory space.

17. The memory expansion device of claim 14, wherein the read process is the speculative read process in response to determining the submission is of the third priority, the speculative read process comprising:

determining that the payload can be fetched from the NVM subsystem and loaded into a private memory of the local memory within a predetermined time period; and loading the payload into the private memory by fetching the payload from the NVM subsystem using NVM read commands.

18. A method, comprising:

at a memory expansion device coupled to a host computer (host) via a dedicated bus, the memory expansion device comprising interface circuitry configured to communicate with the host via the dedicated bus based on a predefined protocol, a non-volatile memory (NVM) subsystem, local memory providing a coherent memory space accessible by the host, and cache memory, receiving a submission from the host, the submission including a read command and a payload defined by a payload specification in the NVM subsystem;

determining a priority of the submission based on the payload specification, wherein the submission is of a first priority if the submission is to resolve a page fault at the host, the submission is of a second priority if the submission is to fetch data from storage, and submission is of a third priority if the submission is to prefetch data from storage; and performing a read process of a plurality of read processes in response to determining the priority of the submission, wherein the read process is based on the priority of the submission and is one or more of a demand read process, a predictive read process, and a speculative read process, and each of the read processes includes indicating completion of the submission in response to acquiring ownership of cache lines in a coherent memory space.

19. The method of claim 18, wherein the memory expansion device includes a controller memory buffer (CMB) including submission queues, accessible by the host, the submission queues including at least a first submission queue for queuing submission of the first priority and at least a second submission queue for queuing submissions of the second priority, wherein the CMB corresponds to a CMB memory space in the local memory.

20. The method of claim 19, further comprising maintaining selected portions of the CMB memory space in a shared state, wherein, in response to a given cache line of the cache lines being modified by the host causing the shared state corresponding to the given cache line being invalidated, re-acquiring the given cache line to reinstate its shared state.

* * * * *